United States Patent
Watson

(10) Patent No.: US 12,439,146 B2
(45) Date of Patent: Oct. 7, 2025

(54) AUTOMATED PORTRAIT, PHOTO POSE, AND SOFT BIOMETRICS CAPTURE SYSTEM

(71) Applicant: Cecil Hugh Watson, Whittier, CA (US)

(72) Inventor: Cecil Hugh Watson, Whittier, CA (US)

(*) Notice: Subject to any disclaimer, the term of this patent is extended or adjusted under 35 U.S.C. 154(b) by 0 days.

(21) Appl. No.: 18/678,068

(22) Filed: May 30, 2024

(65) Prior Publication Data

US 2024/0406535 A1  Dec. 5, 2024

Related U.S. Application Data

(60) Provisional application No. 63/469,619, filed on May 30, 2023.

(51) Int. Cl.
| | | |
|---|---|---|
| *H04N 23/611* | (2023.01) | |
| *G06V 40/16* | (2022.01) | |
| *H04N 23/695* | (2023.01) | |

(52) U.S. Cl.
CPC ......... *H04N 23/611* (2023.01); *G06V 40/167* (2022.01); *G06V 40/171* (2022.01); *H04N 23/695* (2023.01)

(58) Field of Classification Search
CPC .............. H04N 23/611; H04N 23/695
See application file for complete search history.

(56) References Cited

U.S. PATENT DOCUMENTS

| | | | |
|---|---|---|---|
| 10,769,412 B2 | 9/2020 | Thompson et al. | |
| 2009/0125487 A1* | 5/2009 | Rossi | G06F 16/583 |
| 2009/0185723 A1* | 7/2009 | Kurtz | G06V 40/50 |
| | | | 382/118 |
| 2016/0307057 A1 | 10/2016 | Li et al. | |
| 2017/0148241 A1* | 5/2017 | Kerning | H04W 12/08 |
| 2020/0105056 A1* | 4/2020 | Mitchell | G06T 17/10 |
| 2020/0314330 A1* | 10/2020 | Takayama | H04N 23/65 |

FOREIGN PATENT DOCUMENTS

| | | | | |
|---|---|---|---|---|
| CA | 3065806 A1 | * | 12/2018 | ......... G06K 9/00288 |
| CN | 101216881 B | | 7/2011 | |
| CN | 202931375 U | * | 5/2013 | |
| CN | 110874577 A | | 3/2020 | |

(Continued)

OTHER PUBLICATIONS

English translation of CN 202931375 U Pang, 2013 (Year: 2013).*

(Continued)

*Primary Examiner* — James M Hannett
(74) *Attorney, Agent, or Firm* — Bold IP, PLLC; Houda El-Jarrah; Troy Schmelzer

(57) ABSTRACT

A system for capturing, identifying, and processing images and soft biometrics includes an image capture device, a pan and tilt device, a speaker for audio feedback, and a microphone for voice capture, all controlled by a computing device. Image capture is enhanced by detecting image focus, facial recognition matching, detecting the number of subjects and unwanted objects, and checking the cropped image by detecting whether eyes and mouth are open or closed, detecting redeye, detecting background color, detecting lighting conditions, and detecting subject location, pose and expression. Soft biometrics including scars, marks, and tattoos are also identified, cropped and classified.

20 Claims, 16 Drawing Sheets

(56) References Cited

FOREIGN PATENT DOCUMENTS

WO          2011138813 A1    11/2011
WO   WO-2023214957 A1 *  11/2023

OTHER PUBLICATIONS

"Mugshot Imaging, Picture Link", dynamicimaging.com. https://www.dynamicimaging.com/solutions/mugshot-imaging/ [Date accessed: Mar. 24, 2023].
"Munission SmartShot, Easy. Accurate Mug Shot Photo Capturing and Reporting," munission.co. https://www.munission.co/munission-smartshot [Date accessed: Mar. 24, 2023].
Unlock the world. Future-proof solutions backed by the latest advancements in biometric and cryptographic technologies, https://www.idemia.com [Date accessed: Jan. 31, 2023].
"Safety—Security—Efficiency. Orchestrating A Brighter World. Solving Challenges Through Innovation And Collaboration," https://www.necam.com [Date accessed: Jan. 31, 2023].
"DataWorks Plus. Iris Recognition. Tatoo Recognition. Facial Recognition & Case Management," https://www.dataworksplus.com/bioid.html#face [Date accessed: Jan. 31, 2023].

\* cited by examiner

AUTOMATED PORTRAIT, PHOTO POSE, AND SOFT BIOMETRICS CAPTURE SYSTEM

CROSS-REFERENCE TO RELATED APPLICATIONS

This application is a non-provisional application that claims the benefit of priority of U.S. provisional patent application No. 63/469,619, filed on May 30, 2023, which is incorporated herein by reference.

FIELD OF THE DISCLOSURE

This disclosure relates generally to computerized systems and methods for processing and managing images and biometric data. More specifically, the present disclosure pertains to systems that facilitate precision in tasks such as portrait pose and cropping, photo capture, and soft biometrics capture for law enforcement, civilian and governmental agencies.

BACKGROUND

The present invention pertains to the field of computerized image capture systems, such as those designed to assist various entities such as law enforcement, civilian and governmental agencies, including the Department of Motor Vehicles (DMV), US Department of State, and the US Department of Defense. More generally, the image capture system of the present invention pertains to any image capture task needing precision in portrait pose and cropping, photo capture, and soft biometrics capture. For instance, the image capture system of the present invention may be used to capture and precisely crop an image of one or more persons in any desired pose.

Commonly used standards that dictate the cropping of portraits include the American National Standards Institute/National Institute of Standards and Technology-Information Technology Laboratory standard 1-2011 (ANSI/NIST-ITL 1-2011), updated in 2015, and the American Association of Motor Vehicle Administrators (AAMVA) DL/ID Card Design Standard. The ANSI/NIST-ITL 1-2011 standard provides a common format for the interchange of fingerprint, facial, and other biometric information across different systems and agencies. AAMVA is an organization that develops model programs in motor vehicle administration, law enforcement, and highway safety. The AAMVA DL/ID Card Design Standard refers to the guidelines set by AAMVA for the design and format of driver's licenses and identification cards, including but not limited to the photo specifications, security features, and barcode format.

Despite the clear guidelines provided by these standards, adherence is often inconsistent, as illustrated by the myriad of non-compliant "mugshot" images found online. Soft biometrics, which refer to less precise, distinctive personal traits such as scars, marks and tattoos (SMT), also play a critical role in the identification process. The automated capture of such data can significantly enhance productivity and ensure consistency in the description and capture of soft biometrics across different agencies. This uniformity fosters inter-agency cooperation and facilitates efficient data sharing, thereby improving the overall effectiveness of the system.

Voice capture at the time of booking is another critical feature that can greatly assist law enforcement agencies. This additional data point can serve as a valuable tool in their investigative arsenal, providing another layer of identification to augment the biometric data already captured.

Despite the clear guidelines and benefits of these requirements, practical implementation often falls short. The present invention seeks to address these shortcomings by providing a system that ensures exactitude in portrait cropping, photo capture, and soft biometrics capture, in alignment with established standards such as ANSI/NIST-ITL 1-2011 and the AAMVA DL/ID Card Design Standard, thereby enhancing the efficiency and effectiveness of the identification process across multiple entities. More generally, the image capture system of the present invention pertains to any image capture task needing precision in portrait pose and cropping, photo capture, and soft biometrics capture, such as capturing and precisely cropping an image of one or more persons in any desired pose.

The description provided in this background section should not be assumed to be prior art merely because it is mentioned in or associated with this background section. The background section may include information that describes aspects of this disclosure.

SUMMARY

The following summary relates to one or more aspects or embodiments disclosed herein. It is not an extensive overview relating to all contemplated aspects or embodiments, and should not be regarded as identifying key or critical elements of all contemplated aspects or embodiments, or as delineating the scope associated with any particular aspect or embodiment. The following summary has the sole purpose of presenting certain concepts relating to one or more aspects or embodiments disclosed herein in a simplified form to precede the detailed description that follows.

One aspect of this disclosure is a system for capturing, identifying, and processing images and soft biometrics. The system comprises an image capture device configured to capture an image of a subject; a pan and tilt device configured to adjust a position of the image capture device; a speaker configured to provide audio feedback or instructions to the subject while the image is being captured; and a microphone configured to capture a voice clip of the subject. The image capture device, pan and tilt device, speaker, and microphone are under the control of a computing device that detects whether the captured image is properly focused, detects using facial recognition whether the subject in the captured image matches a known image of the subject, detects whether a proper number of subjects are in the captured image, detects whether any unwanted objects or obstructions are in the captured image, crops the captured image, and detects, crops, and classifies any scar, mark, or tattoo (SMT) that is present in the captured image.

In some implementations, the computing device is configured to automatically detect whether the subject is in a correct pose and to operate the image capture device to capture the image when the subject is in the correct pose.

In some implementations, after cropping the captured image, the computing device performs a check of the captured and cropped image. The check comprises detecting whether eyes and mouth of the subject are open or closed in the captured image; detecting any redeye in the captured image; detecting whether a background color of the captured image satisfies the applicable standard; detecting and evaluating lighting conditions of the captured image; detecting a location of the subject in the captured image; detecting whether the subject is in a correct pose; and detecting whether an expression of the subject is compliant with the applicable standard. Based on the results of the check, the computing device either saves the captured image or recaptures another image of the subject.

In some implementations, the computing device uses facial recognition to detect whether the subject has any outstanding warrants or wants.

In some implementations, the computing device detects whether the proper number of subjects are in the captured image using a deep learning based subject detection model.

In some implementations, the computing device detects makeup or face-paint to ensure that a face of the subject is not concealed.

In some implementations, the computing device detects whether any unwanted objects or obstructions are in the captured image using a deep learning based object detection model. In some examples, the deep learning based object detection model is configured to specifically detect and classify eyewear and articles of clothing.

In some implementations, the computing device confirms that the subject is in the correct pose by using a deep learning model to detect facial and body landmarks or by using a deep learning image classification model.

In some implementations, the computing device detects yaw, pitch, and roll of a head of the subject to determine whether the head is properly tilted.

In some implementations, the computing device detects whether the expression of the subject is compliant with the applicable standard by using a deep learning model trained with multiple images of multiple emotion expressions.

In some implementations, the computing device detects, crops, and classifies the SMT using a deep learning detection model, and improves the deep learning detection model using active learning.

In some implementations, the computing device recognizes any text contained in the SMT by optical character recognition (OCR), translates the text if necessary, and stores the text.

In some implementations, the computing device detects a size, a color, and an on body location of the SMT.

In some implementations, when a head of the subject is tilted in the captured image beyond what the specification allows, the computing device calculates a tilt angle of the head, rotates the captured image by the tilt angle, and crops the captured image.

In some implementations, the computing device controls the speaker to announce instructions in a selected language and in a selected gender of the subject. In other implementations, the computing device may automatically select the gender of the speaker based on the age, race, and/or gender of the subject.

In some implementations, the computing device controls the microphone to capture a voice clip from the subject, transcribe the voice clip, and determine whether the voice clip matches a scripted phrase.

In some implementations, the computing device combines multiple images captured by the image capture device to generate a 3D image of the subject. The multiple images may be captured by one image capture device or multiple image capture devices.

In some implementations, the computing device generates an additional image comprising the captured image embedded with a watermark.

In some implementations, the computing device generates an additional image comprising a pencil sketch of the subject.

In some implementations, the computing device detects a heart rate of the subject using a deep learning model to facilitate aid if the subject is in stress.

These and other aspects of this disclosure are described below and depicted in the accompanying drawings and will be further apparent based thereon.

BRIEF DESCRIPTION OF THE DRAWINGS

Various features and advantages of this disclosure will be apparent from the following description and accompanying drawings. The drawings are not necessarily to scale; emphasis instead is placed on illustrating the principles of this disclosure. In the drawings, like reference characters may refer to the same parts throughout the different views. The drawings depict only illustrative examples of this disclosure and are not limiting in scope.

FIGS. 16A-16C are diagrams illustrating the use of body landmarks or key points for detection of a pose that a subject is in.

DETAILED DESCRIPTION

The words "exemplary" and "example" as used herein mean "serving as an example, instance, or illustration." Any embodiment described herein as "exemplary" or as an "example" should not be construed as preferred or advantageous over other embodiments.

The embodiments described herein do not limit the invention to the precise form disclosed, nor are they exhaustive. Rather, various embodiments are presented to provide a description for utilization by others skilled in the art. Technology continues to develop, and elements of the disclosed embodiments may be replaced by improved and enhanced items. This disclosure inherently discloses elements incorporating technology available at the time of this disclosure.

Figure 1:
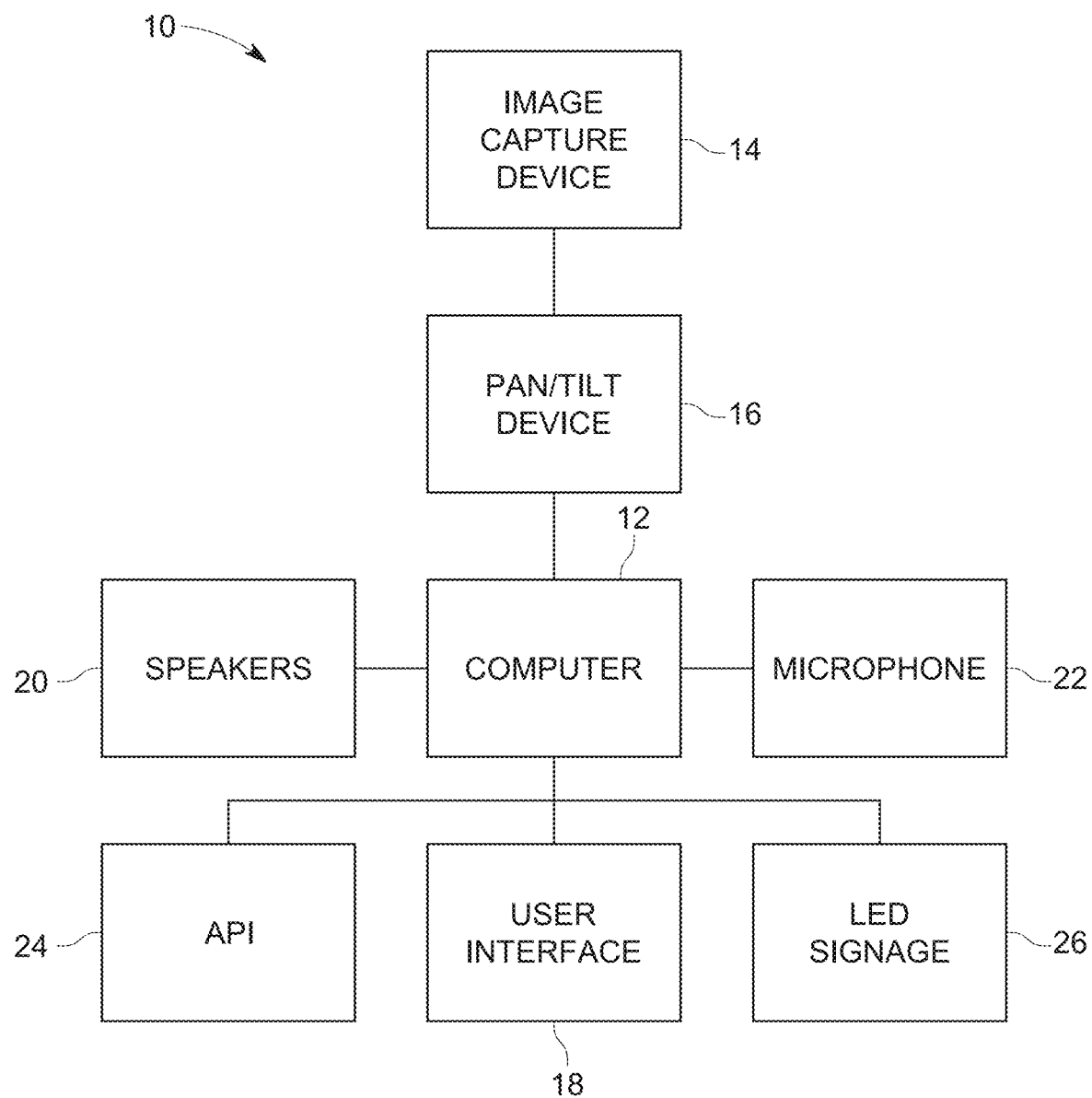
FIG. 1 is a conceptual block diagram of an automated portrait, photo pose, and soft biometrics capture system, in accordance with this disclosure.

FIG. 1 is a conceptual block diagram of an automated portrait, photo pose, and soft biometrics capture system 10, in accordance with this disclosure. System 10 integrates and controls various hardware and software components to optimize the capturing process of subjects of interest, including portraits, soft biometrics, and voice. While the following description is made primarily with reference to static image files such as portraits, it should be understood that this disclosure is applicable as well to video files and live video.

System 10 includes computing device or computer 12 which acts as the central processing unit of system 10. Computer 12 controls and integrates all other components of system 10, running software that enables the automation and optimization of the capture process. Image capture device 14, which may be a digital camera or similar equipment, is controlled by computer 12 to capture images of the subject. In some examples, computer 12 may be a client coupled to a server using a socket connection. If the socket connection is broken, either computer 12 (the client) or the server can determine that the connection is broken. Once the connection is reestablished, computer 12 (the client) and the server can communicate as to where in the image capture process connectivity is lost and continue. Thus, image capture may continue where left off when computer 12 or the server is disconnected.

Image capture device 14 can capture high quality portraits, head shots, body shots, and soft biometric data such as images of scars, marks, and tattoos (SMT). In some examples, system 10 may include multiple image capture devices (cameras) 14 that can capture images and/or live feed simultaneously and from different angles. In some examples, and as will be described in more detail below, image capture device 14 is a stereoscopic camera, such that precise measurements of distance between image capture device 14 and the subject can be made. Using the measured distance of the subject from the camera and a chart of known object sizes at various distances, the size of objects in the image (such as SMTs and body parts, for example) can be calculated. Pan and tilt device 16 is connected to image capture device 14 and comprises automated pan and tilt hardware that centers image capture device (camera) 14 on a point of interest, thereby providing ease of image capture. Pan and tilt device 16 allows for automatic adjustment of the position of image capture device 14, ensuring optimal capture of the subject from various angles. Pan and tilt device 16 is controlled by computer or computing device 12, which adjusts the position of pan and tilt device 16, and controls the functions of image capture device 14, based on the requirements of the capture process.

System 10 also includes user interface 18, which allows users to interact with the system, inputting commands and preferences. User interface 18 may include, for example, a display screen, keyboard, mouse, and/or touchscreen, and it communicates with computer 12 to enable user control over the system. Speakers 20 and microphone 22 are also included in system 10. Microphone 22 captures voice data of the subject, which is processed and stored by computer 12. Speakers 20 provide audio feedback or instructions to the subject or to the operator during the capture process.

System 10 also incorporates an application programming interface (API) 24, enabling the system to integrate with outside systems. API 24 facilitates communication between system 10 and external systems and software, allowing the exchange of data and commands. LED signage 26 may also be connected to computer 12 to provide visual cues or instructions to the subject. This can help guide the subject during the capture process, ensuring optimal positioning and cooperation. This configuration of system 10 automates the capture of portraits, soft biometrics, and voice, ensuring optimal quality and consistency while enabling easy integration with external systems.

Figure 2:
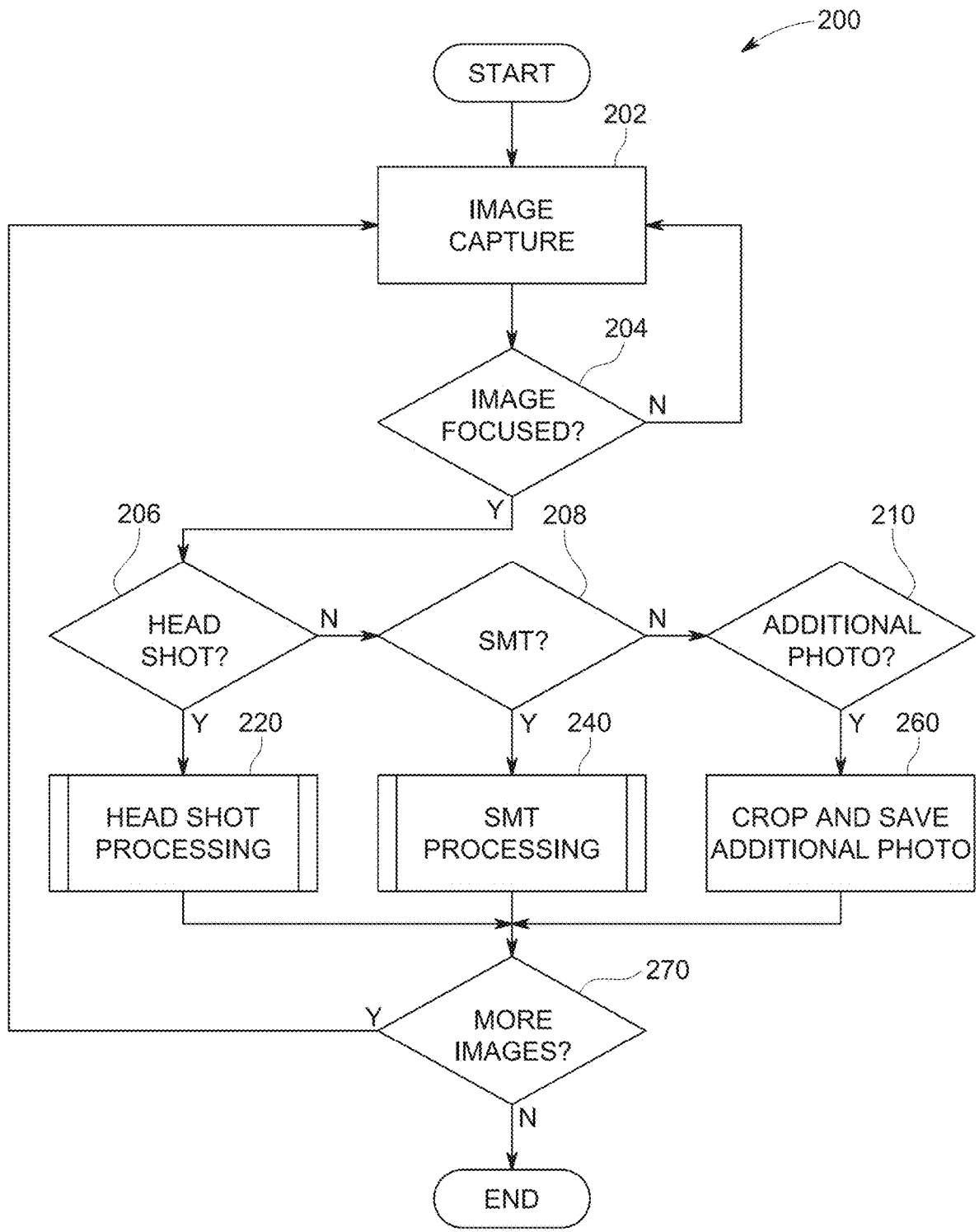
FIG. 2 is a flow diagram of a method for capturing, identifying, and processing images that is implemented by the system of FIG. 1, in accordance with this disclosure.

FIG. 2 is a flow diagram of a method 200 for capturing, identifying, and processing images that is implemented by system 10, in accordance with this disclosure. An image is captured in step 202, using image capture device 14 under the control of computer 12. Various types of images may be captured by system 10, including portraits (head shots), soft biometrics (scars, marks, tattoos, i.e., SMTs), and additional photos as may be necessary to capture other features of the subject not captured by head shot or SMT images.

In some examples, in step 202, there is total automation in the live stream before the image is captured. In particular, the subject is told to move to a specific pose (in some examples, via instructions announced via speakers 20), and once computer 12 has determined that the subject is in the correct pose, image capture device 14 automatically captures the image. For example, and as described further below with reference to FIG. 8, audio and visual prompting of the subject may be provided to achieve compliance and to ensure that the subject is directed into the right poses and that a quality image is captured. Subject instructional buttons, when pressed, may cause appropriate instructions ("look up", "turn left", "turn right", "don't smile", etc.) to be announced over speakers 20 in the selected language of the subject. As will be described further below with reference to FIG. 16, facial and body landmarks can be detected and used in conjunction with a machine learning model to confirm that the subject is in the correct or a desired pose before image capture device 14 captures the image in step 202.

Next, in step 204, computer or computing device 12 automatically detects whether the captured image is properly focused (image focus detection). If not (i.e., if the image is blurry), the method returns to step 202 to recapture the image. A modal may be displayed in user interface 18, for example, advising the user that the image is blurry and prompting the operator to recapture the image (see, e.g., FIG. 9). In step 204 and in other steps of the image capture process described below, audio and/or visual prompting of the operator may be provided to achieve compliance and to ensure that the operator is engaged and that a quality image is captured. If the image is properly focused, method 200 proceeds depending on what type of image has been captured.

If the image is a head shot or portrait (206-Y), the image is subject to head shot processing at step 220. Head shot processing 220 is described in more detail with reference to FIG. 3. In some embodiments, facial recognition may first be used to automatically detect whether the subject in the image matches a known image of the subject. Facial landmarks may be used, by a deep learning model in some examples, to ensure that the subject is in the proper pose with face centered to provide an exact crop. In this regard, deep learning is a subset of machine learning that involves the use of neural networks to model complex patterns and relationships in data. For head shots, the subject may be looking straight at the camera or may have their head turned for a profile view. System 10 also automatically detects whether the proper number of subjects are in the image (usually one) and detects whether any unwanted objects or obstructions such as purses, bags, eyewear, masks, etc. are in the image. In some examples, deep learning models are used to make these determinations. Head shot processing step 220 also conducts a multi-point check to assess whether various aspects of the image comply with applicable standards (such as NIST), including no redeye, proper background, proper lighting (exposure and saturation), proper pose, face is centered, eyes open, mouth closed, proper expression (such as neutral).

If the image is of a soft biometric such as a scar, mark, or tattoo (SMT) (208-Y), the image is subject to SMT processing at step 240. In this regard, where the image is a portrait (head shot), steps 220 and 204 may be conducted simultaneously. That is, the head shot (portrait) may be cropped and any soft biometrics (SMTs) present in the head shot image may also be detected, cropped, and classified at the same time, thereby speeding up the booking or other process. SMT processing step 240 is described in more detail with reference to FIG. 4. In short, any SMTs in the image are automatically detected, identified, cropped and classified. In some examples, deep learning models are used to identify, crop, and classify SMTs. In addition to classifying the SMT, the size, the color, and the on body location, and content of the text (i.e., words or phrase) may be determined and stored.

If the image is an additional photo (such as a body shot, for example) that is not a head shot or an SMT (step 210-Y), the additional photo is cropped and saved in step 260. Additional photos may be useful, for example, if the subject wears glasses, heavy makeup, or wore a disguise during commission of an offense. It may sometimes also be useful to capture an additional photo before the subject cleans up for a head shot. As will be explained, additional photos may be captured before or after (or both) the head shots and SMT photos are captured. If there are more images to be captured (270-Y), such as different head shot poses, additional SMTs or additional photos, the method returns to image capture block 202.

Figure 3:
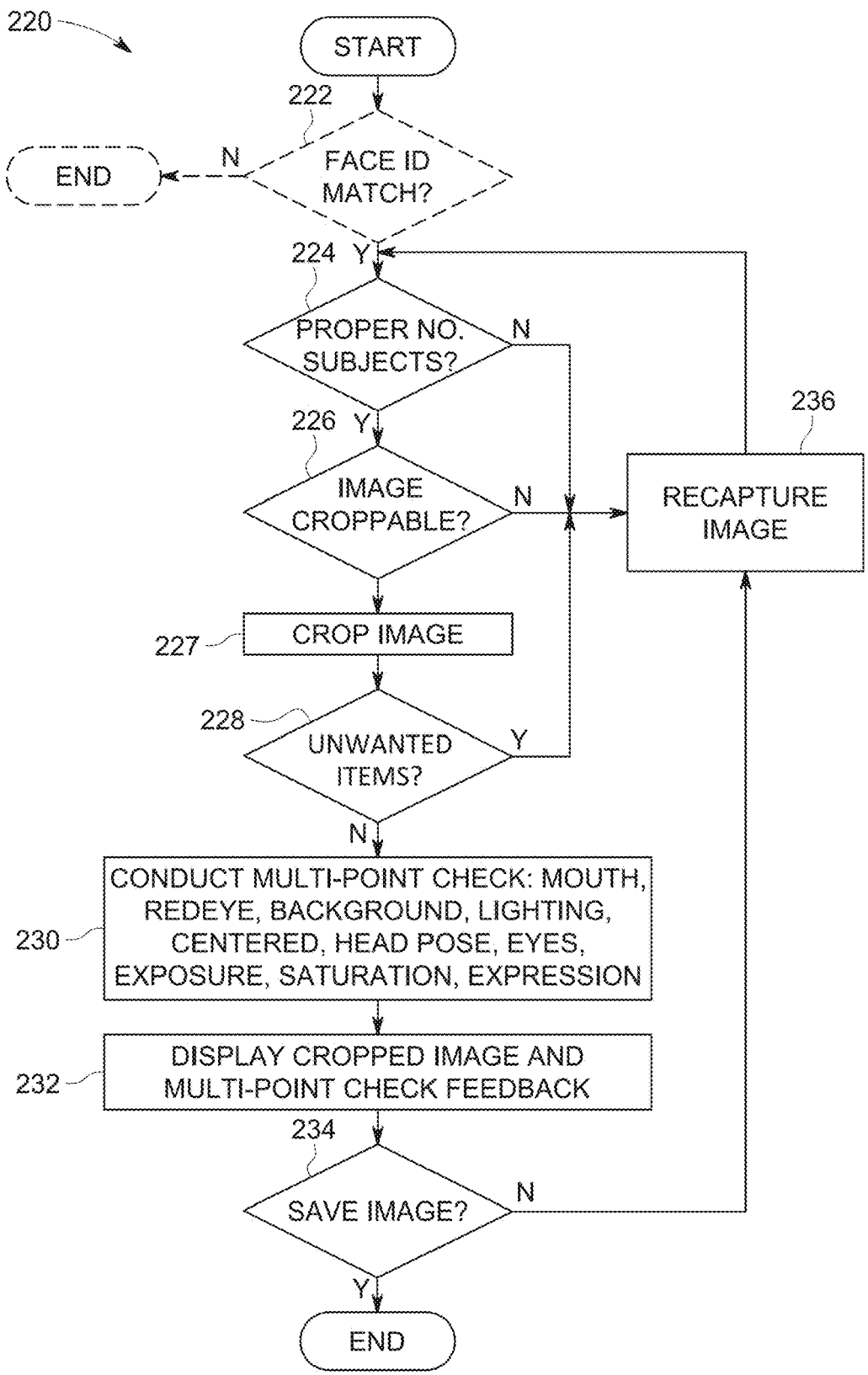
FIG. 3 is a flow diagram of the steps involved in the head shot processing block of the method of FIG. 2, in accordance with this disclosure.

FIG. 3 is a flow diagram of the steps involved in head shot processing block 220 of method 200, in accordance with this disclosure. As an optional first step (222), facial detection, recognition and tracking may be utilized by computer 12 to ensure that the subject matches a known image of the subject, and also to ensure that all portraits are of the same subject. Facial detection and recognition may also be used in step 222 to determine whether the subject has any outstanding wants and/or warrants. If there is not a facial ID match (222-N), head shot processing 220 may terminate since this indicates that the subject is not the person whose headshot is sought. Alternatively, the image may be recaptured to attempt facial recognition again.

A determination is then made by computer 12 as to whether the proper number of subjects are in the frame (step 224). In some examples, a deep learning person or subject detection model is used to make this determination. The proper number of subjects is usually one, though it may be more than one in some circumstances. If the proper number of subjects are not in the frame (224-N), the operator is directed to recapture the image in step 236. A modal may be displayed in user interface 18, for example, advising the operator that the frame does not contain the proper number of subjects and prompting the operator to recapture the image.

In step 226, computer 12 determines whether the image is croppable. In some examples, deep learning models are used to detect varying numbers of body and facial landmarks to ensure that the subject is in the proper pose (body and head). Gaze detection may also be used to ensure that the subject is looking in the specified direction. Once certain landmarks are known, in some examples, traditional computer vision methods are used to crop the portrait. While other systems require the operator to correctly locate the subject's eyes, this disclosure uses deep learning models with facial landmarks to obtain a portrait that is automatically cropped to exacting standards. For example, deep learning models with 5, 68, 468, or any other number of facial landmarks may be used to obtain an exact crop. NIST best practices, for example, call for the subject's head to be 50 percent or 75 percent of the width of the portrait. Using facial landmarks, at both sides of the face, the width of the face is calculated. Using the calculated face width, the total width of the final image is calculated. As there is a proper ratio for the height and width of the resulting photograph, the width may be used to determine the height of the image with the face in the center as required. In conjunction with step 226, the position of the subject in the image may be detected and checked to ensure that the image can be properly cropped.

If the image cannot be properly cropped (226-N), the operator is directed to recapture the image in step 236. A modal may be displayed in user interface 18, for example, advising the operator that the image cannot be cropped and prompting the operator to recapture the image. If the image is croppable (226-Y), the image is cropped in step 227.

In step 228, computer 12 determines whether there are any unwanted objects or obstructions in the frame. Examples of unwanted objects or obstructions include, without limitation, hands, eyeglasses, hats, purses, masks, jewelry, etc. The frame should include the subject only without any such objects or obstructions. If there are unwanted objects or obstructions in the frame (228-Y), the operator is directed to recapture the image in step 236. A modal may be displayed in user interface 18, for example, advising the operator that the image contains unwanted objects or obstructions and prompting the operator to recapture the image. Step 228 may further include detection of makeup, face-paint, etc., to ensure that the subject's face is not concealed.

A deep learning based object or obstruction detection model may be used in step 228 to determine whether there are any unwanted objects or obstructions in the frame. In some examples, the deep learning model may detect and classify specific objects or obstructions, such as eyewear and clothing. Some specifications do not permit eyewear to be worn, for example, in which case the operator and the subject may be prompted to remove the eyewear. Conversely, some specifications may require a photo with eyewear, in which case photos with and without eyewear may be captured. With respect to clothing, the specification may differentiate between certain articles of clothing (i.e., hijab vs. hoodie vs. headwrap), which may or may not be allowed depending on the particular specification. In some examples, prosthesis detection may be implemented by using a deep learning based object detector to detect prosthetic limbs. In some examples, in conjunction with object detection, active learning by tracking and classifying detected objects versus user accepted and manually cropped objects may improve the deep learning model.

In step 230, a multi-point check of the cropped image is carried out by computing device 12. The multi-point check includes, without limitation: detection and image classification of head features and/or facial landmarks, such as whether the subject's eyes and mouth are open or closed; detection of redeye; detection of whether the background color satisfies the applicable specification (NIST best practices, for example, specifies that the background should be 18% gray); detection and evaluation of lighting conditions, such as whether the exposure and saturation meets the applicable specification and to confirm that special lighting is in use if it is called for; detection of the subject's location in the photo, such as whether the face is centered; detection of whether the subject is in the correct pose (the yaw, pitch, and roll of head may be detected to ensure that the subject's head tilt falls within the applicable specification, and deep learning based image classification may be used for pose detection); and detection of whether the subject's expression is compliant with the applicable specification. These are just some examples of aspects of the image that may be checked for compliance with applicable standards; in some instances, more (or fewer) aspects may be checked. For example, step 230 may also include a nudity detection and censorship step to ensure that no nude photos are taken.

Figure 16A:
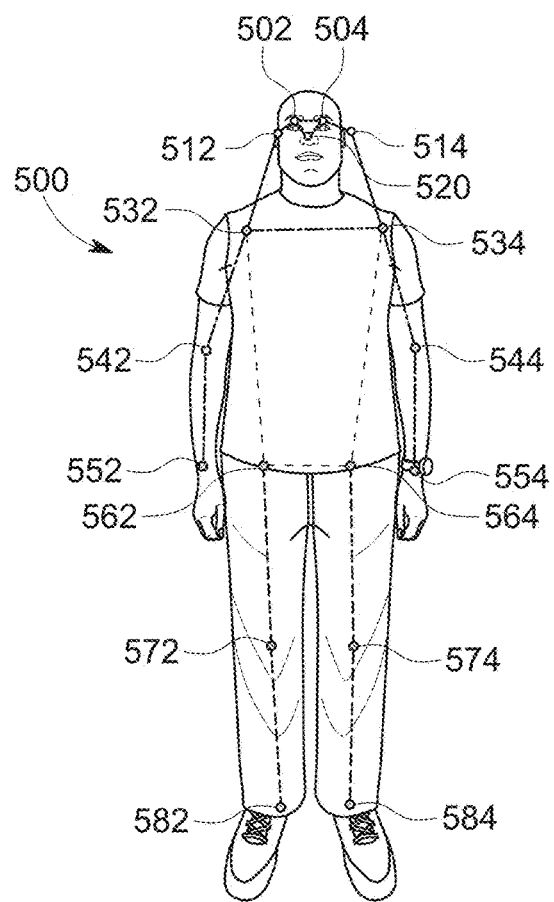
Figure 16B:
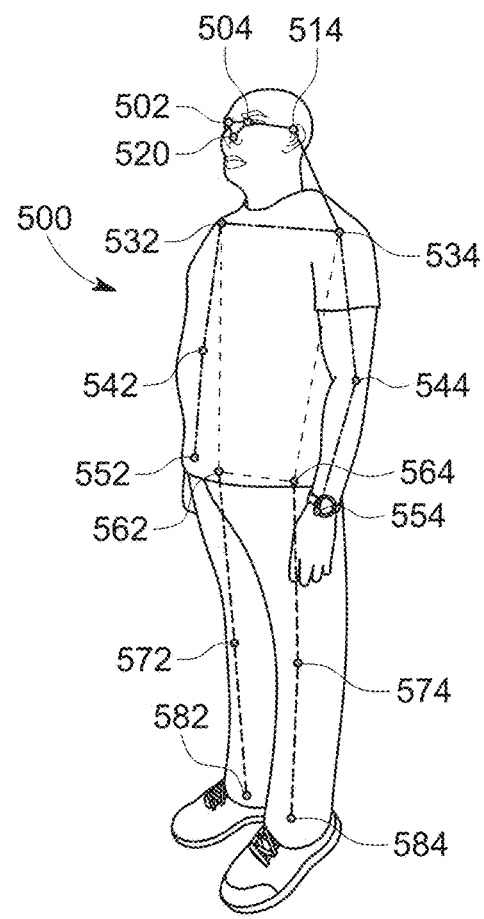
Figure 16C:
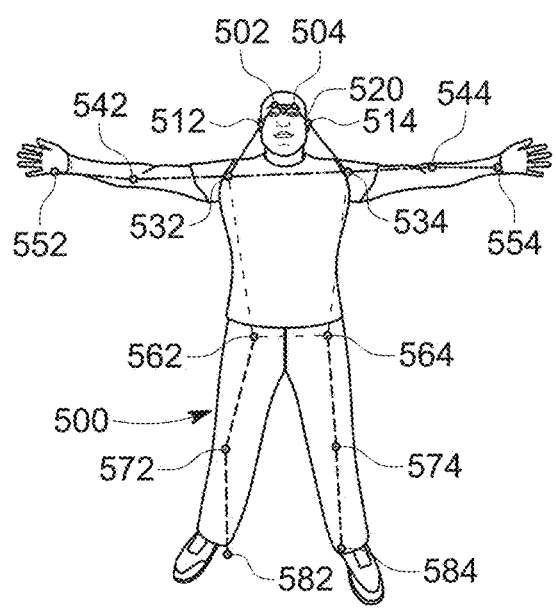

Facial and body landmarks and/or key points may be detected and used for pose detection and classification in the multi-point check of step 230. As discussed above, pose detection using facial and body landmarks or key points may also occur during image capture step 202 (FIG. 2) where image capture device 14 automatically captures the image once computer 12 determines that the subject is in the correct pose. FIGS. 16A-16C illustrate the use of body landmarks or key points for detection of the pose that subject 500 is in. Using computer vision techniques, computer 12 detects specific key points on the face and body such as, for example, eyes 502, 504; ears 512, 514; nose 520; shoulders 532, 534; elbows 542, 544; wrists 552, 554; hips 562, 564; knees 572, 574; and ankles 582, 584. The alignment and positioning of these key points in relation to each other and to a predefined ideal pose can be used to determine if subject 500 is in the correct pose. For example, in FIG. 16A, computer or computing device 12 may determine using the illustrated key points that subject 500 is in a front-facing pose; in FIG. 16B, computer 12 may determine that subject 500 is in a right-facing pose; and in FIG. 16C, computer 12 may determine that subject 500 is in a front-facing pose with arms and legs spread. With respect to pose detection, computer 12 may build and use a machine learning model based on the key points (pixel locations) to determine or classify the pose that subject 500 is in. Computer 12 may also build and use a deep learning image classification model based on the entire image to determine and classify the pose that subject 500 is in. In some examples, active learning by tracking image classification results versus user saved fields may improve the deep learning image classification model.

Facial and body landmarks and key points may also be used to determine body parts and on body location of soft biometrics such as tattoos. If subject 500 has a tattoo on his right forearm (between elbow key point 544 and wrist key point 554), for example, the tattoo and its pixel coordinates will be detected by computer 12 in the captured image. Using the known pixel coordinates of the tattoo and key points 544, 554 containing the forearm, techniques such as intersection over union can be used to determine the on-body location of the soft biometric (tattoo), which information is stored by system 10.

Figure 17A:
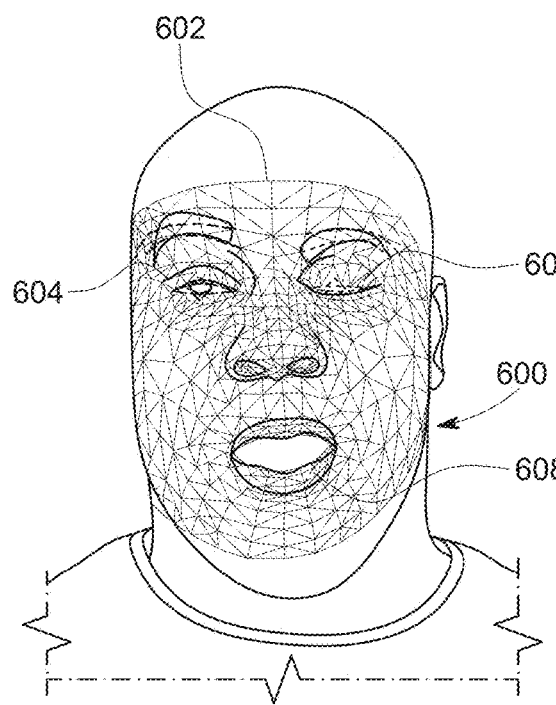
FIGS. 17A-17C are diagrams illustrating the use of a mesh over a subject's face for detection of facial landmarks and key points.
Figure 17B:
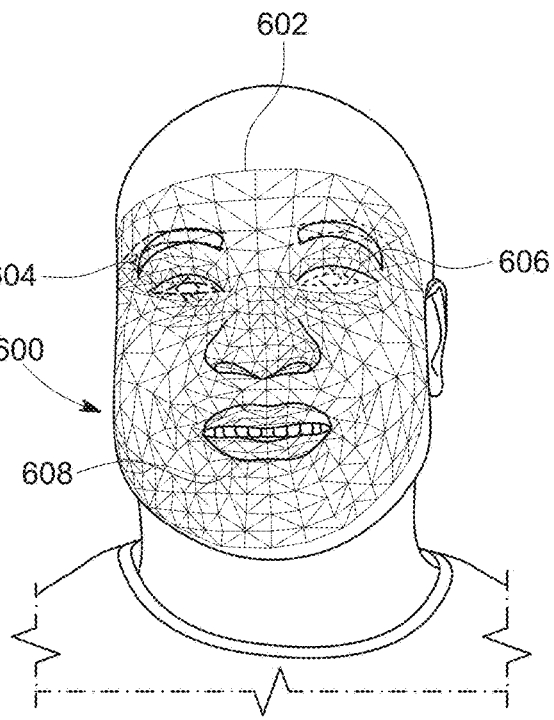
Figure 17C:
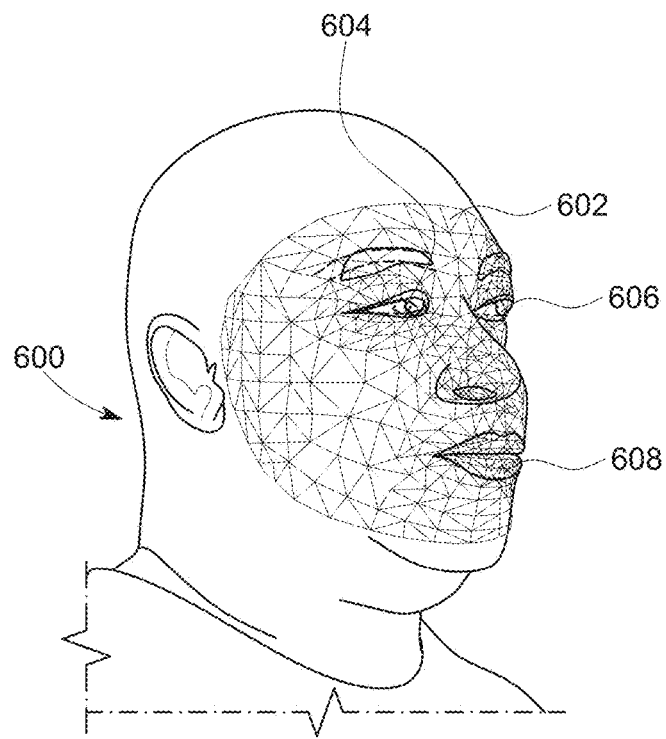

Facial landmarks and key points may be detected by computer 12 and used to determine facial features such as the width of the subject's face, eyes and mouth, distance between eyes, whether the eyes and mouth are opened or closed, etc. FIGS. 17A-17C illustrate the use of a mesh 602 over a subject's face 600 for detection of facial landmarks and key points. In one non-limiting example, mesh 602 contains 468 points on face 600. In FIG. 17A, for example, computer 12 may determine that the subject is in a front-facing pose with the right eye open; left eye closed, and mouth open; in FIG. 17B, computer 12 may determine that the subject is in a front-facing pose with both eyes 604, 606 open and mouth 608 partially open; and in FIG. 17C, computer 12 may determine that the subject is in a left-facing pose with eyes 604, 606 open and mouth 608 closed (ideal).

In addition to detecting facial landmarks and key points, computer 12 may also use deep learning based image classification of head and facial features (eyes and mouth, open or closed, etc.). The Facial Image Comparison Feature List for Morphological Analysis of the Facial Identification Scientific Working Group (FISWG) (Version 2.0, Sep. 11, 2018), for example, defines a set of facial features, characteristics, and descriptors that may be detected, measured, and classified by computer 12. The facial features defined by the FISWG document include, without limitation, skin; face/head outline; proportions/positions of features such as nose, mouth, eyes, ears, lips, chin, jawline, hair, neck, facial hair, facial lines, and SMTs such as scars, marks, tattoos, piercing, and makeup. Capturing measurements of such facial features at the time of image capture using facial landmarks and a stereoscopic camera to accurately measure distance of camera to subject allows for greater accuracy then that provided by known tools. This information is embedded in the demographics or images for system 10 to consume, and allows for greater accuracy when comparing facial features. In known tools for facial analysis, by contrast, the facial analysis does not occur until after the image is captured and on backend systems without accurate knowledge of the distance of the camera to the subject, camera used, camera focal point, etc. Such backend systems then use averages to calculate the distance between various facial features, which results in far less precise facial measurements than those provided by applicant's disclosure.

In connection with image classification of head and facial features, deep learning based hair style classification and facial hair classification may also be performed by computer 12. Hair style classifications may include, for example, male crew cut hair style; female bob cut hair style, widow's peak, etc. Facial hair classifications may include, for example, beard, goatee, mustache, etc.

With respect to expression detection in step 230, a deep learning model may be trained with multiple images for various emotion expressions in order to ensure that a subject's appearance is compliant with any applicable specification. For example, NIST, AAMVA and the US Department of State require a neutral expression in all portrait photographs. The subject's expression may be presented in real time to the operator in the live capture preview.

In step 234, the cropped image as well as the results of the multi-point check are displayed to the user. Based on the results of the check, the operator may decide to recapture the image (234-N) or save the image (234-Y). A modal may be displayed in user interface 18, for example, displaying the results of the multi-point check and prompting the operator to either save or recapture the image (see, for example, screen capture 450 of FIG. 11).

Figure 4:
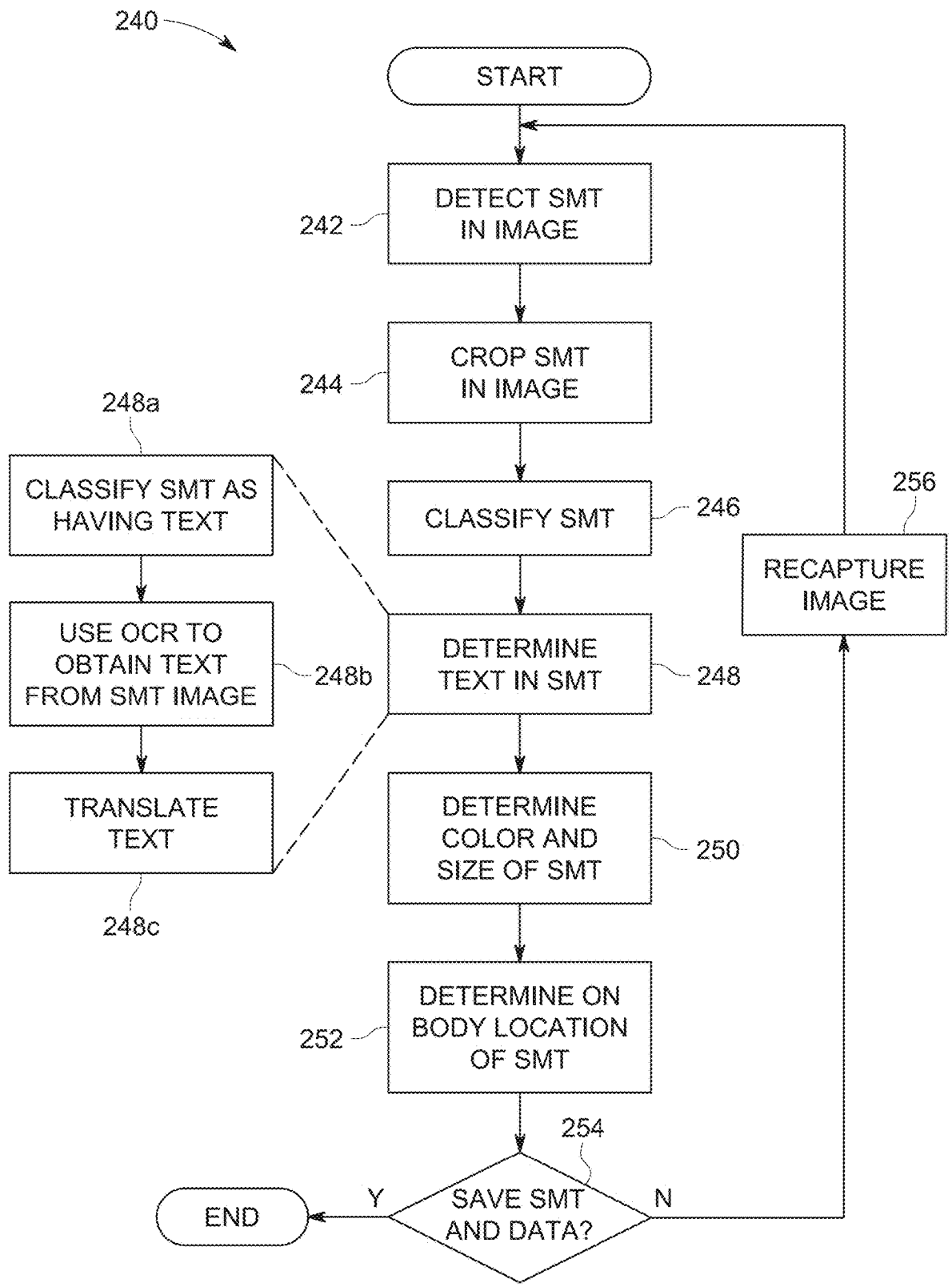
FIG. 4 is a flow diagram of the steps involved in the SMT processing block of the method of FIG. 2, in accordance with this disclosure.

FIG. 4 is a flow diagram of the steps involved in soft biometrics (SMT) processing block 240 of method 200, according to aspects of this disclosure. SMT processing block 240 captures soft biometrics including scars, marks, and tattoos (SMT). First, the image is analyzed and any SMTs in the image are automatically detected (step 242) and cropped (step 244). In one example, a deep learning detection model is used to make these determinations and to speed up and automate detection, capture, and cropping of scars, marks, and tattoos relative to manual detection and cropping. Active learning by tracking image classification of SMTs may be used to improve deep learning models. Active learning may be used in the detection of the tattoo as well. One deep learning model detects the tattoo as well as the number of tattoos. The deep learning model may sometimes detect a false-positive, which may be deleted by the user. The user may also need to manually crop a tattoo that is missed by the deep learning model. By tracking the number of tattoos detected and the number of tattoos saved by the user, discrepancies can be detected and flagged to help develop a newer and improved deep learning detection model. Deep learning detection and recognition of SMTs may also be used to assist in determining whether the subject has any wants and/or warrants.

In step 246, the detected and cropped SMTs are automatically classified by class and subclass. In one example, a deep learning classification model is used to classify the detected and cropped SMTs, thereby speeding up and automating data entry and ensuring consistent and quality descriptions across systems. Tattoo classifications may be found, for example, in Table 80 of the NIST specification. A tattoo of a horse may be classified, for example, as class ANIMAL and subclass HORSE. The date of the deep learning based SMT detection, cropping, and classification should be collected as well.

In step 248, if the SMT contains text, the content of the text (words and/or phrases, for example) is determined and stored. Step 248 may include, for example, classifying the SMT as having text (step 248a), using optical character recognition (OCR) to obtain the text from the SMT image (step 248b), and translating the text if necessary (step 248c). In some examples, where a tattoo is classified as having text, deep learning based tattoo OCR and translation may be used to recognize and translate the text. In step 250, the size (in imperial and/or metric) and color of the tattoo are determined and stored. In some examples, the distance from the subject is measured to use as a reference for measuring the size of soft biometrics. In step 252, the location on the body of the SMT (i.e., neck, arm, chest, foot, etc.) is determined and stored. In this regard, on body localization of soft biometrics detects where on the body an SMT is located and speeds up and automates data entry. The data gathered about the SMT (classification, size, color, location, text if any) is stored in connection with the SMT image (254-Y) unless the operator opts to retake the SMT image (254-N).

SMT processing method 240 of FIG. 4 greatly speeds up and automates SMT processing and ensures that SMT images and associated data are collected in a uniform and consistent manner across multiple agencies. Previous SMT processing and collection procedures, in which officers generally must manually capture and crop SMT images and manually complete fields such as class, subclass, color, size, text, etc., are cumbersome and time consuming and often result in incomplete and nonuniform collection of data.

Figure 5:
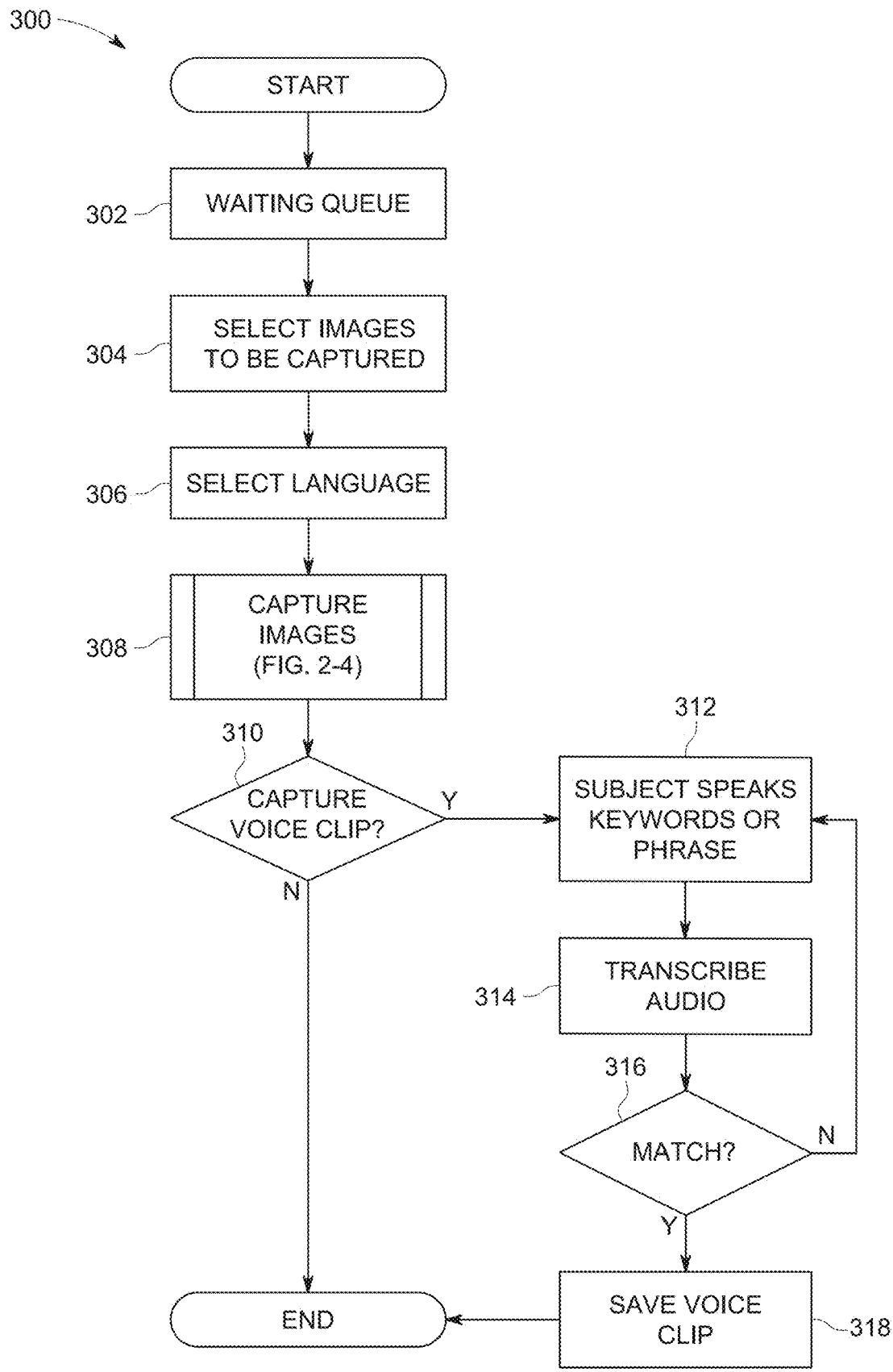
FIG. 5 is a flow diagram of a method for operating a system that incorporates the image capturing, identifying, and processing method of FIGS. 2-4, in accordance with this disclosure.

FIG. 5 is a flow diagram of a method 300 for operating system 10 of FIG. 1 that incorporates the image capturing, identifying, and processing method 200 of FIGS. 2-4, according to aspects of this disclosure. Method 300 is described in connection with exemplary user interface screenshots in FIGS. 6-15.

Figure 6:
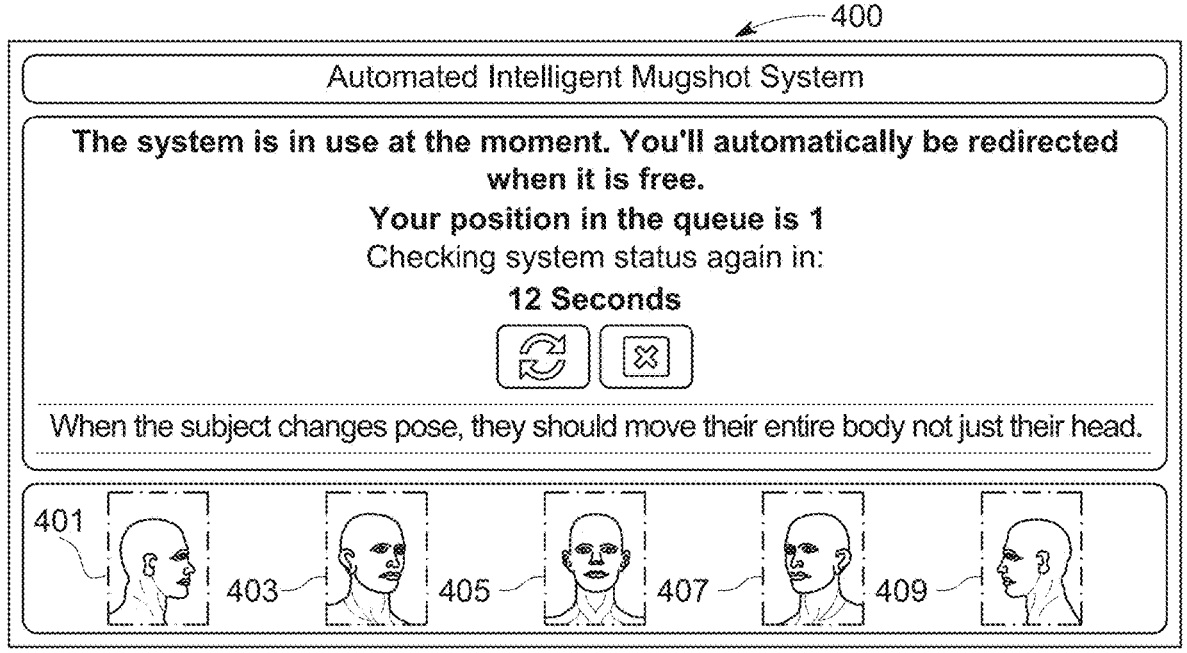
FIG. 6 is a user interface screenshot of an exemplary waiting queue, in accordance with this disclosure.

In step 302 of method 300, a waiting queue is provided. In some environments that support multiple operators, such as in many law enforcement environments, there may be only one image capture device that is shared among multiple operators. Thus, queue 302 is provided to manage multiple clients (operators) and to allow multiple operators to use the system without interfering with one another. FIG. 6 is a user interface screenshot 400 of an exemplary waiting queue, in accordance with this disclosure. Screenshot 400 advises the operator that the system is currently in use and shows the operator's position in the queue. Screenshot 400 also illustrates various types of exemplary head poses available, including a 90 degrees right-side profile 401; a 45 degrees right-side profile 403; a frontal profile 405; a 45 degrees left-side profile 407; and a 90 degrees left-side profile 409.

Figure 7:
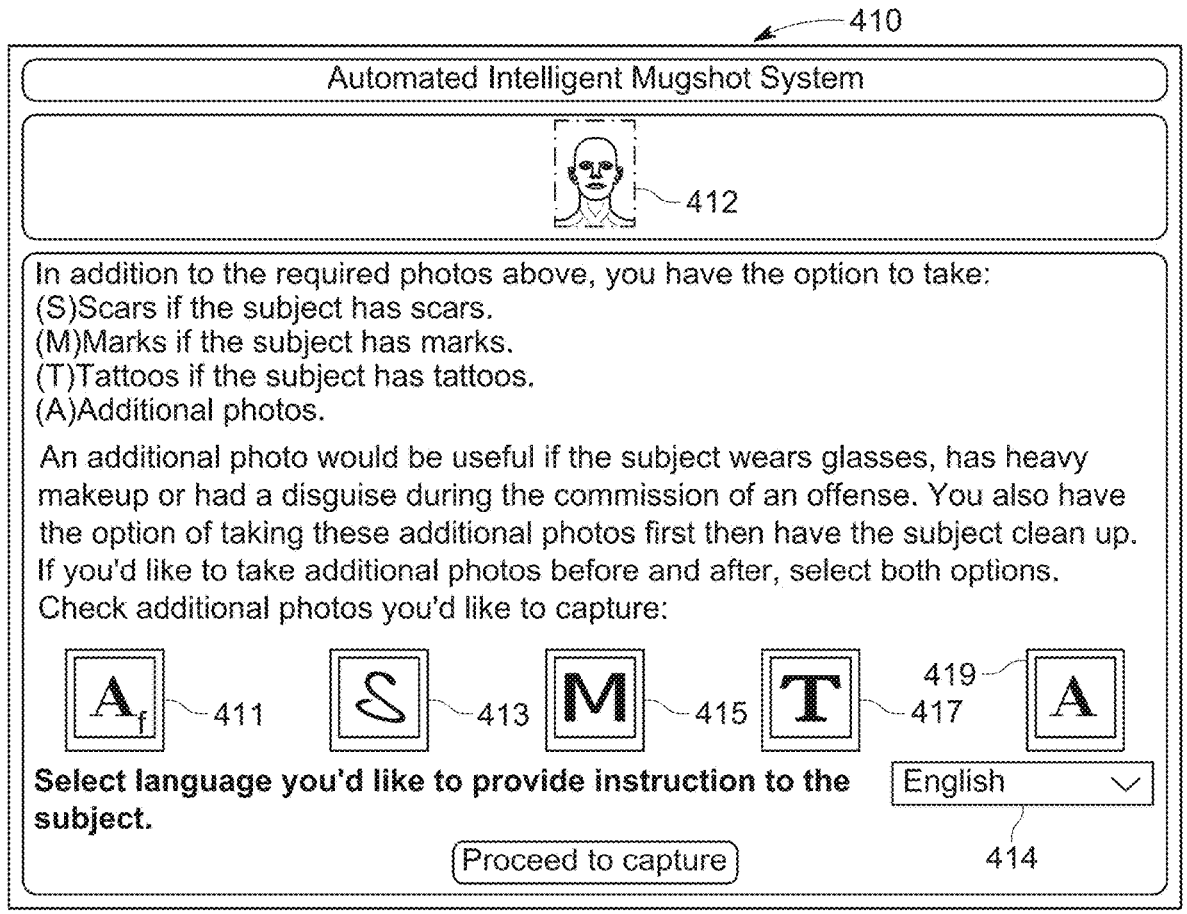
FIG. 7 is a user interface screenshot of an exemplary image selection screen, in accordance with this disclosure.

In step 304 of method 300, once the operator has moved to the front of the queue, the operator selects the particular images to be captured. Typically, capture of at least one frontal head shot is required (i.e., frontal profile 405), and in some instances, capture of one or more side profile headshots may also be required. Beyond these required photos, the operator is able to select additional images to be captured. FIG. 7 is a user interface screenshot 410 of an exemplary image selection screen, in accordance with this disclosure. The operator may select from an additional photo 411 that is captured first (before head shots and SMTs); a scar photo 413; a mark photo 415; a tattoo photo 417; and an additional photo 419 that is captured last (after head shots and SMTs). The operator may select to capture some, all, or none of these additional photos. Additional photos may be useful if the subject typically wears items that may not be captured in the head shot(s), such as eyeglasses, heavy makeup, disguises, jewelry, hats, etc.). An additional photo may be chosen to be captured first, for example, before the subject cleans up for the head shot.

In addition to image selection, screenshot 410 may display an avatar 412 that dynamically reflects the age, race, gender, and face of the subject. In some examples, deep learning based age, race, and gender detection is used to create avatar 412 of the subject.

In step 306 of method 300, the operator selects the language in which instructions will be provided to the subject. Language selection is provided, in some examples, at location 414 of image selection screenshot 410. Typically, the operator will select the subject's native language as the language in which instructions will be provided. In addition, as men and women perceive male and female voice differently, instructions may be provided in a male or female voice. In some implementations, the instructions may be announced in a language and gender selected by the subject.

In other implementations, the gender of the spoken instructions may be automatically selected based on the age, race, and/or gender of the subject.

In step 308 of method 300, the selected images are captured. Step 308 encompasses method 200 for capturing, identifying, and processing images of FIG. 2, including head shot processing step 220 of FIG. 3 and SMT processing step 240 of FIG. 4. FIGS. 8-15 depict exemplary user interface screenshots during image capture step 308.

Figure 8:
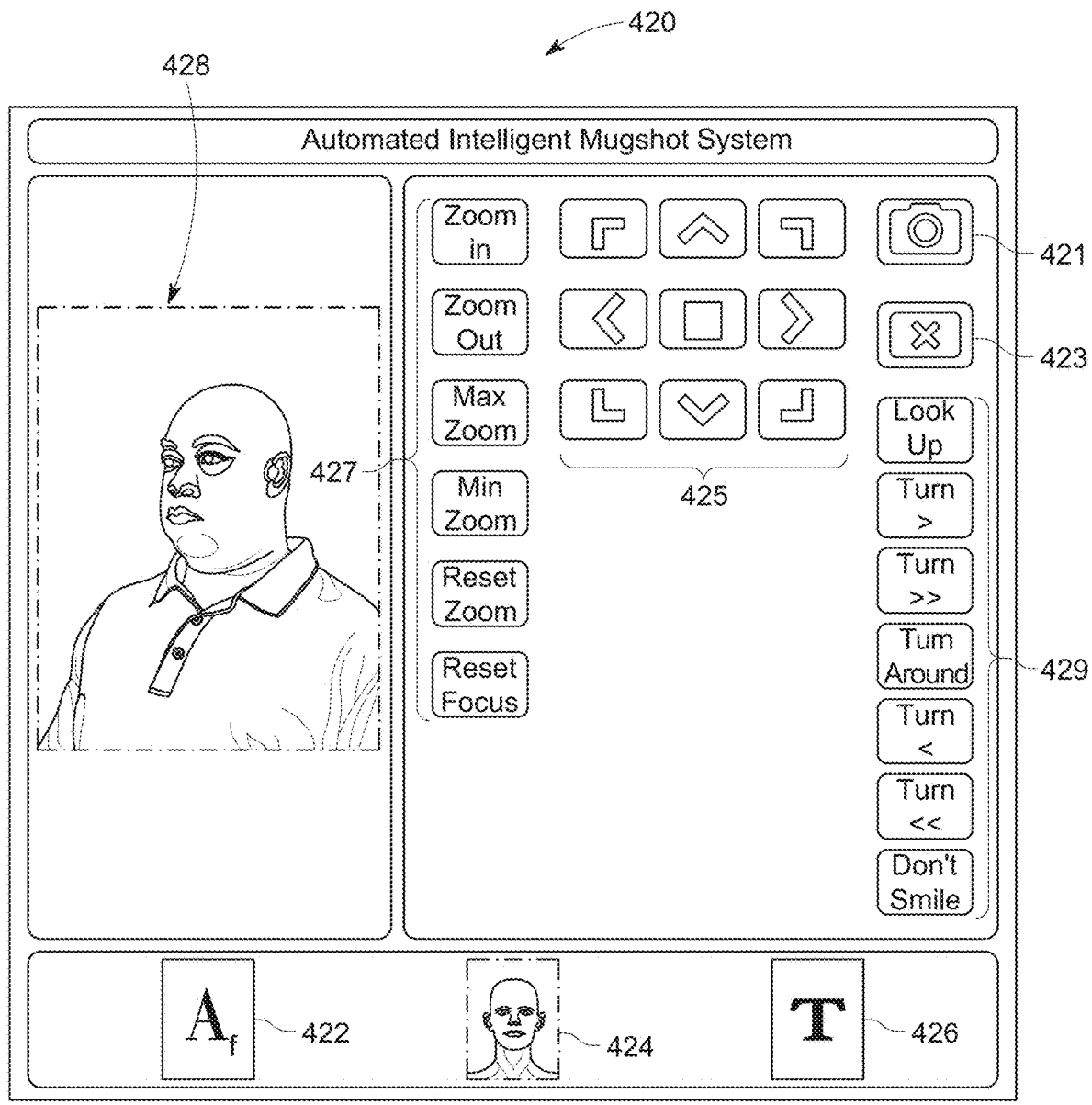
FIG. 8 is a user interface screenshot of an exemplary image capture screen, in accordance with this disclosure.

Step 308 of method 300 begins with image capture step 202 of FIG. 2. FIG. 8 is a user interface screenshot 420 of an exemplary image capture screen that may be displayed during image capture step 202, in accordance with this disclosure. In screenshot 420, capture of a frontal head shot 424 is required, and the operator has also opted to capture a first additional photo 422, as well as a photo 426 of the subject's tattoo. As these images are captured, the icons shown at 422, 424, 426 may be replaced by thumbnails of the captured images. In one example, screenshot 420 includes image capture button 421; cancel button 423; pan, tilt and cropping buttons 425; zoom in/out and reset buttons 427; and subject instructional buttons 429.

In some examples, as described above, images are captured automatically when the subject is in the right pose. For a portrait, when a head of the subject is tilted in the captured image beyond what the specification allows, the system may calculate a tilt angle of the head, rotate the captured image by the tilt angle, and crop the captured image. In another example, if the subject is currently in a wrong pose but it is a pose that needs to be captured, the pose may be saved and the subject prompted to get into the correct pose. In some examples, when images are automatically captured, such as during head shot processing step 220, buttons 425, 427 that allow operator control over image capture may not be provided.

Audio and visual prompting of the subject may be provided to achieve compliance and to ensure that the subject is directed into the right poses and that a quality image is captured. In one example, subject instructional buttons 429, when pressed, cause an instruction ("look up", "turn", "don't smile", etc.) to be announced over speakers 20 in the selected language of the subject. The image, once captured, is displayed in image display area 428. In some examples, multi-language verbal instructions may be given to both the operator and subject to ensure understanding and cooperation between the operator and subject.

Figure 9:
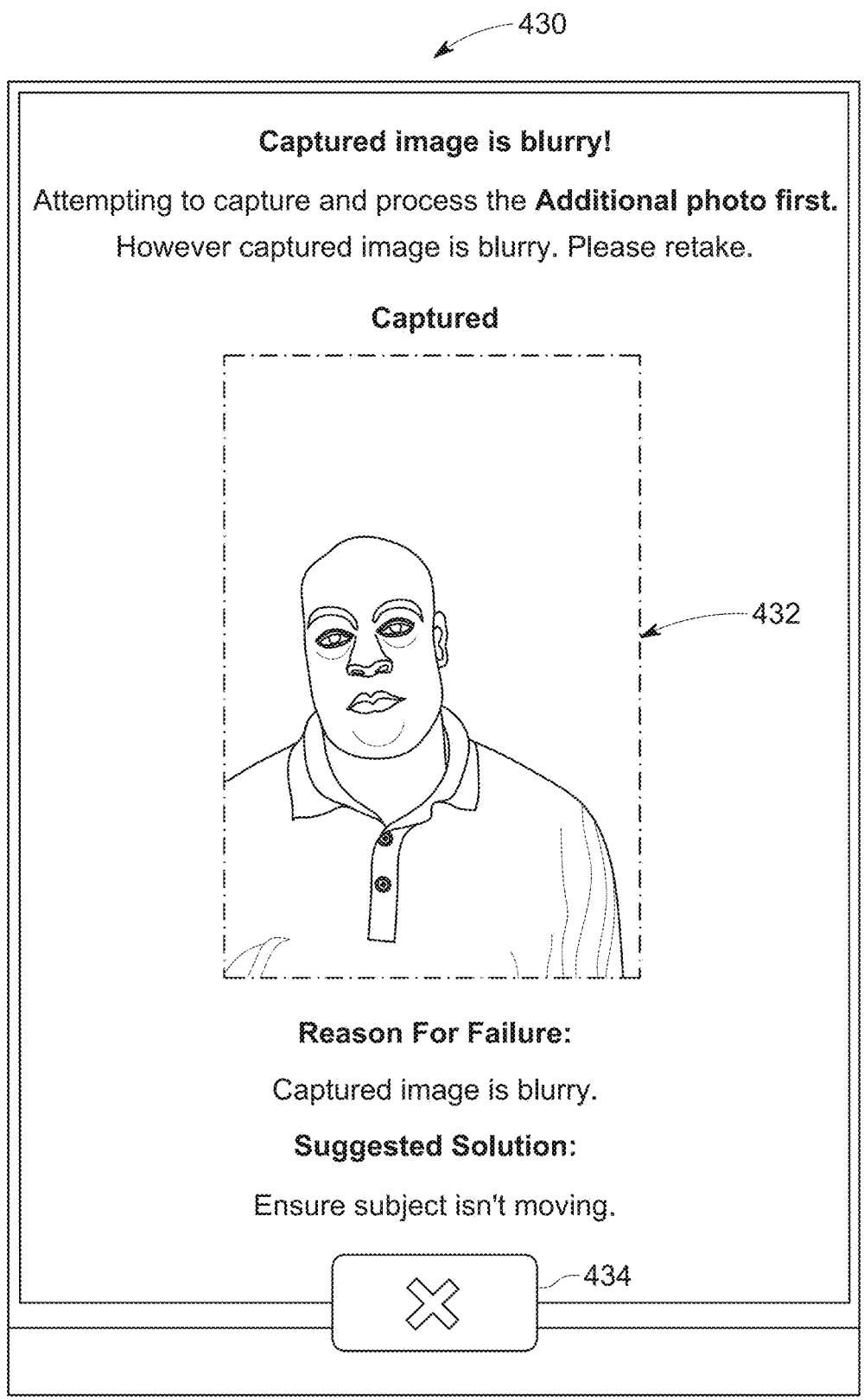
FIG. 9 is a user interface screenshot of an exemplary modal that may be displayed when a captured image is blurry, in accordance with this disclosure.

Step 308 of method 300 also includes step 204 of FIG. 2 to determine whether the captured image is properly focused. If the image is not properly focused (i.e., the image is blurry), the operator is prompted to recapture the image. FIG. 9 is a user interface screenshot 430 of an exemplary modal that may be displayed when a captured image is blurry, in accordance with this disclosure. Screenshot 430 advises that the captured image is blurry and prompts the operator to recapture the image. In screenshot 430, the captured blurry image 432 is displayed along with the reason for failure (the captured image is blurry) and the suggested solution when the image is retaken (ensure that the subject is not moving). Button 434 allows the operator to recapture the image.

Figure 10:
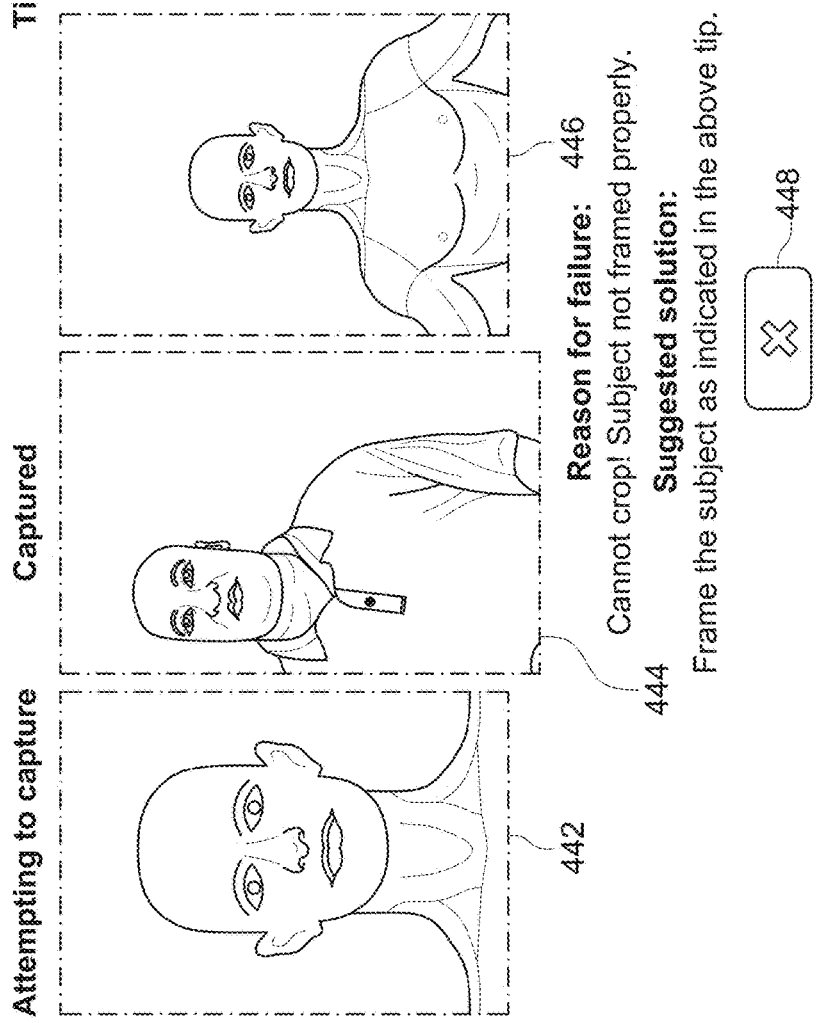
FIG. 10 is a user interface screenshot of an exemplary modal that may be displayed when a captured image cannot be cropped, in accordance with this disclosure.

Step 308 of method 300 also includes head shot processing step 220 of FIGS. 2 and 3, in which various initial checks are made including whether the image includes the proper number of subjects (step 224), whether the image includes unwanted objects or obstructions (step 226), and whether the image can be properly cropped (step 228). FIG. 10 is a user interface screenshot 440 of an exemplary modal that may be displayed when a captured image cannot be cropped, in accordance with this disclosure. In particular, screenshot 440 shows an instance where the subject was not framed properly. Image 442 in screenshot 440 is the image that the operator was attempting to capture (in this example, a properly framed frontal head shot), and image 444 is the image that the operator captured (in this example, an improperly framed frontal head shot). Screenshot 440 displays the reason for failure (cannot crop because subject is not framed properly) along with a suggested solution in the form of image 446 as to how the subject should be framed. Button 448 allows the operator to recapture the image.

Step 308 of method 300 also includes step 230 of head shot processing step 220 in which a multi-point check of the cropped head shot image is carried out. As described with reference to FIG. 3, the multi-point check may include, without limitation, detection and image classification of head features and/or facial landmarks, such as whether the subject's eyes and mouth are open or closed; detection of redeye; detection of whether the background color satisfies the applicable specification; detection and evaluation of lighting conditions; detection of the subject's location in the photo, such as whether the face is centered; detection of whether the subject is in the correct pose; and detection of whether the subject's expression is compliant with the applicable specification.

Figure 11:
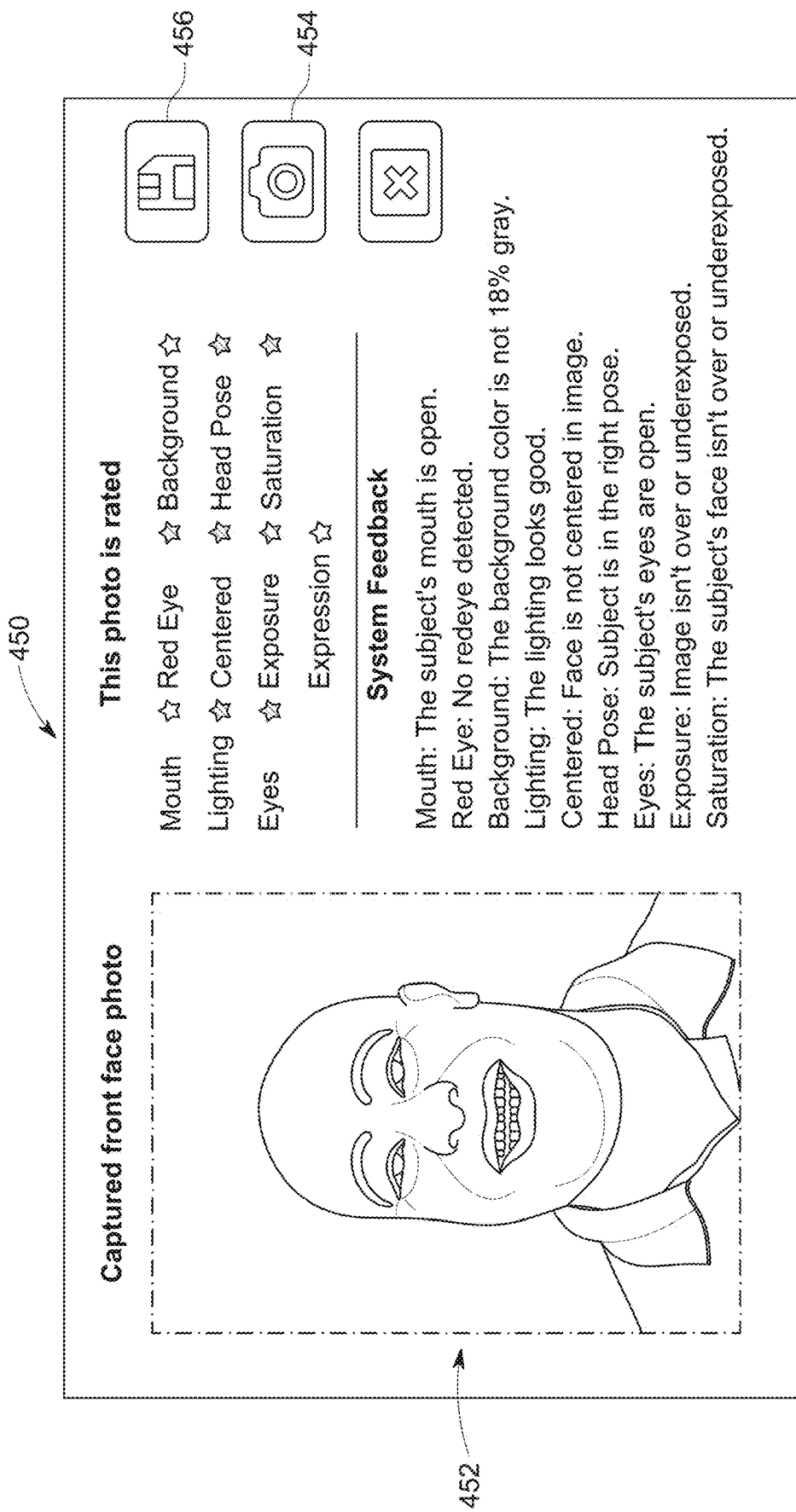
FIG. 11 is a user interface screenshot of an exemplary modal for displaying results of a head shot multi-point check, in accordance with this disclosure.

FIG. 11 is a user interface screenshot 450 of an exemplary modal for displaying the results of the head shot multi-point check, in accordance with this disclosure. Screenshot 450 displays the captured front face photo 452 next to system feedback in the form of the results of the multi-point check. Here, system 10 provides positive feedback in that no redeye was detected, the lighting complies with applicable standards, the subject is in the correct pose (frontal head shot), the subject's eyes are open, and the image is properly exposed and saturated. System 10 also provides negative feedback in that the subject's mouth is open (mouth should be closed), the background color is not 18% gray as required, the subject's face is not centered in the image, and the subject's expression is not neutral (subject's expression is happy). The operator is prompted to either recapture the image to fix these issues by pressing button 454, or to save the image without correcting the issues by pressing button 456.

Figure 12:
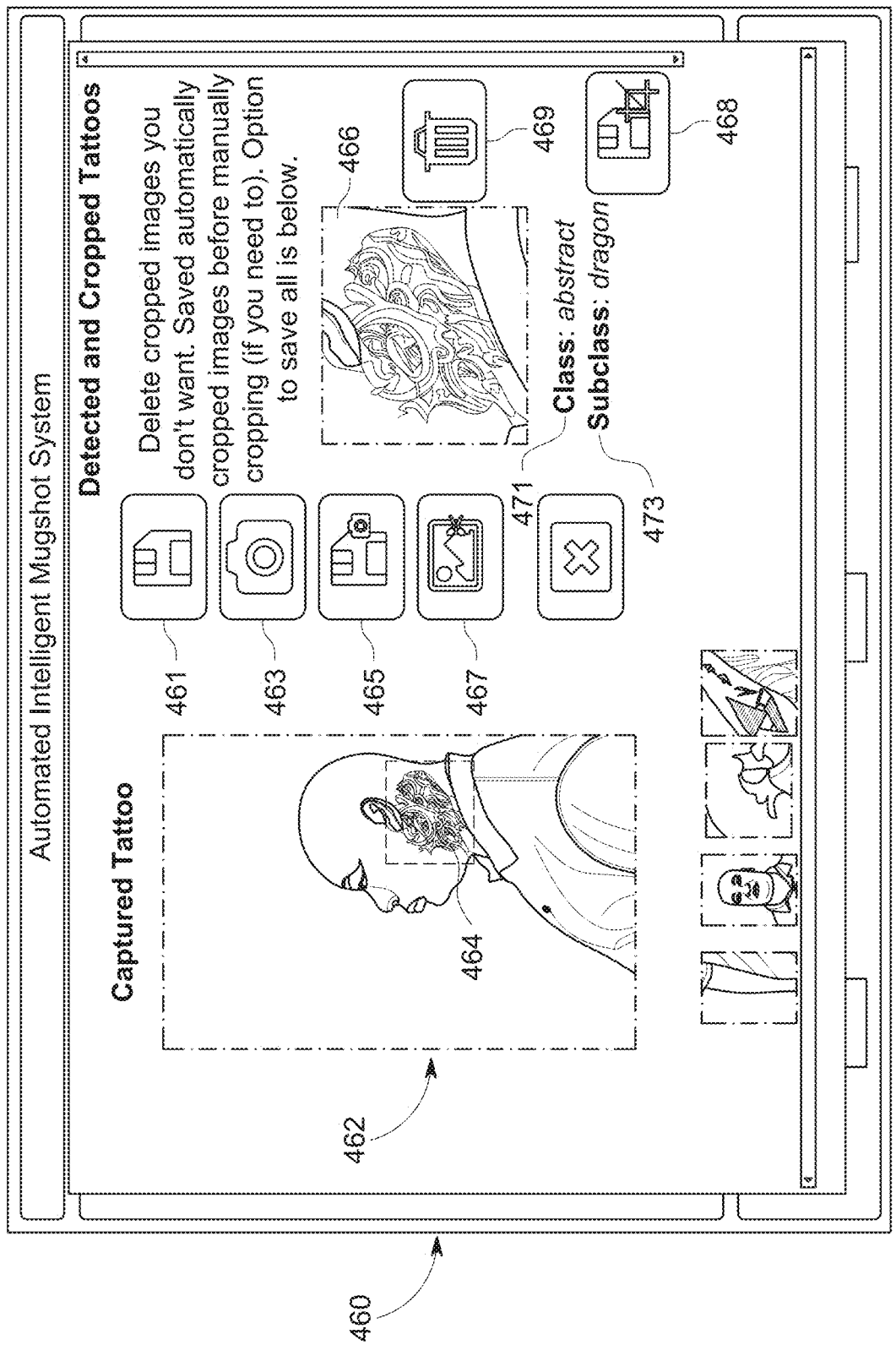
FIG. 12 is a user interface screenshot of an exemplary SMT processing screen in which a tattoo is captured, detected, and cropped, in accordance with this disclosure.

Step 308 of method 300 also includes SMT processing step 240 of FIGS. 2 and 4 in which an SMT in a captured image is automatically detected, cropped and classified. FIG. 12 is a user interface screenshot 460 of an exemplary SMT processing screen in which a tattoo is captured, detected, and cropped, in accordance with this disclosure. Screenshot 460 depicts a captured image 462 that includes a tattoo 464, along with the automatically detected and cropped image 466 of the tattoo. As can be seen in FIG. 12, the automatically detected and cropped image 466 of tattoo 464 has been slightly enlarged by the operator to show its body context (on neck; below ear). As can also be seen in FIG. 12, tattoo 464 has also been automatically classified by class 471 and subclass 473 (class: abstract; subclass: dragon) Screenshot 460 provides various operator options including button 461 for saving the detected and cropped tattoo as is; button 463 for recapturing the tattoo; button 465 for saving the image and capturing another image of a tattoo; button 467 for manually cropping the image; button 468 for saving the image before manually cropping the image; and button 469 for deleting the image.

Figure 13:
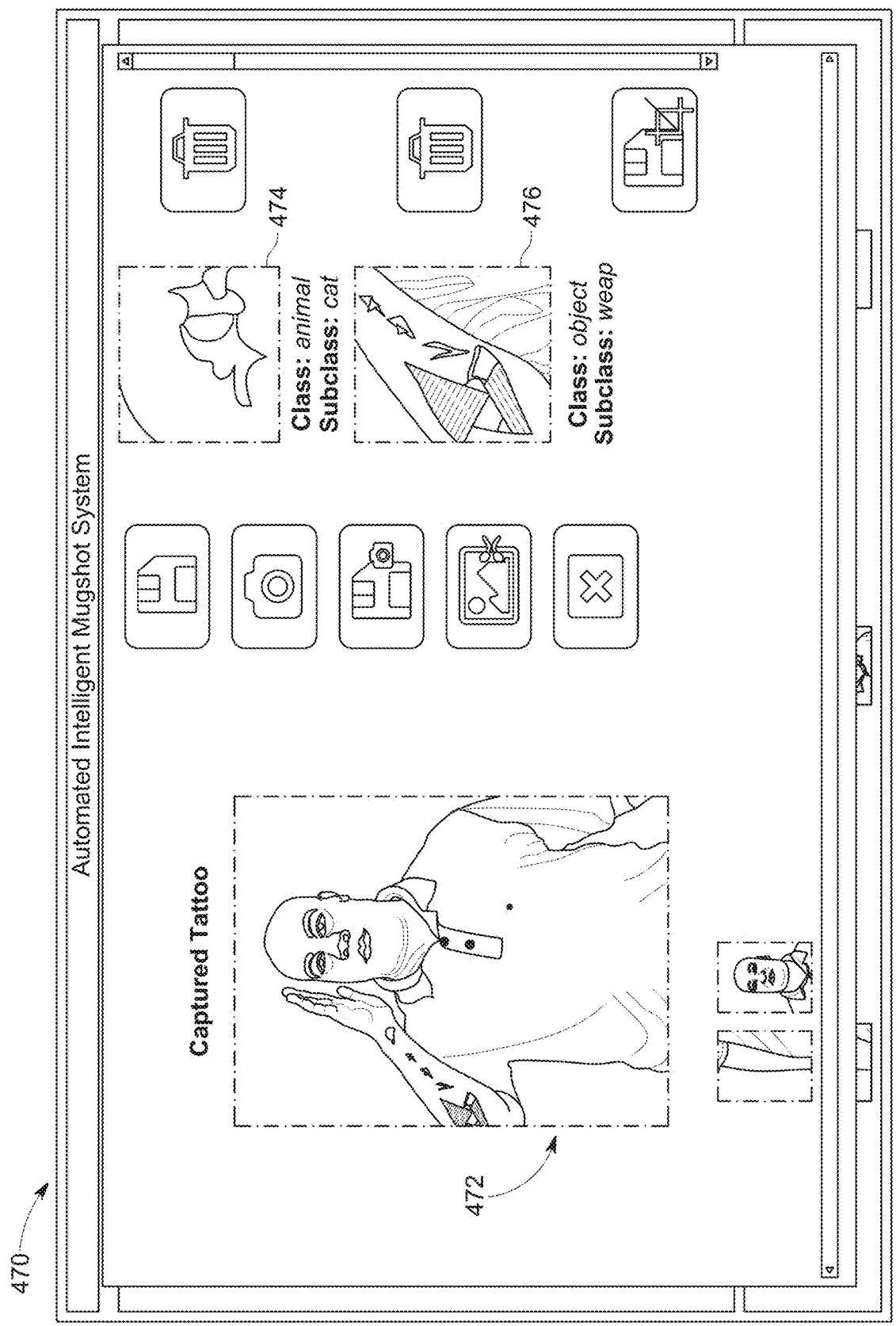
FIG. 13 is a user interface screenshot of an exemplary SMT processing screen in which multiple tattoos are captured, detected, and cropped, in accordance with this disclosure.

FIG. 13 is a user interface screenshot 470 of an exemplary SMT processing screen in which multiple tattoos are captured, detected, and cropped, in accordance with this disclosure. Captured image 472 of screenshot 470 includes multiple tattoos 474, 476, each of which is automatically detected, cropped, and classified. As in screenshot 460 in which various operator options are provided for processing a single tattoo, various operator options are provided in screenshot 470 for processing multiple tattoos.

Figure 14:
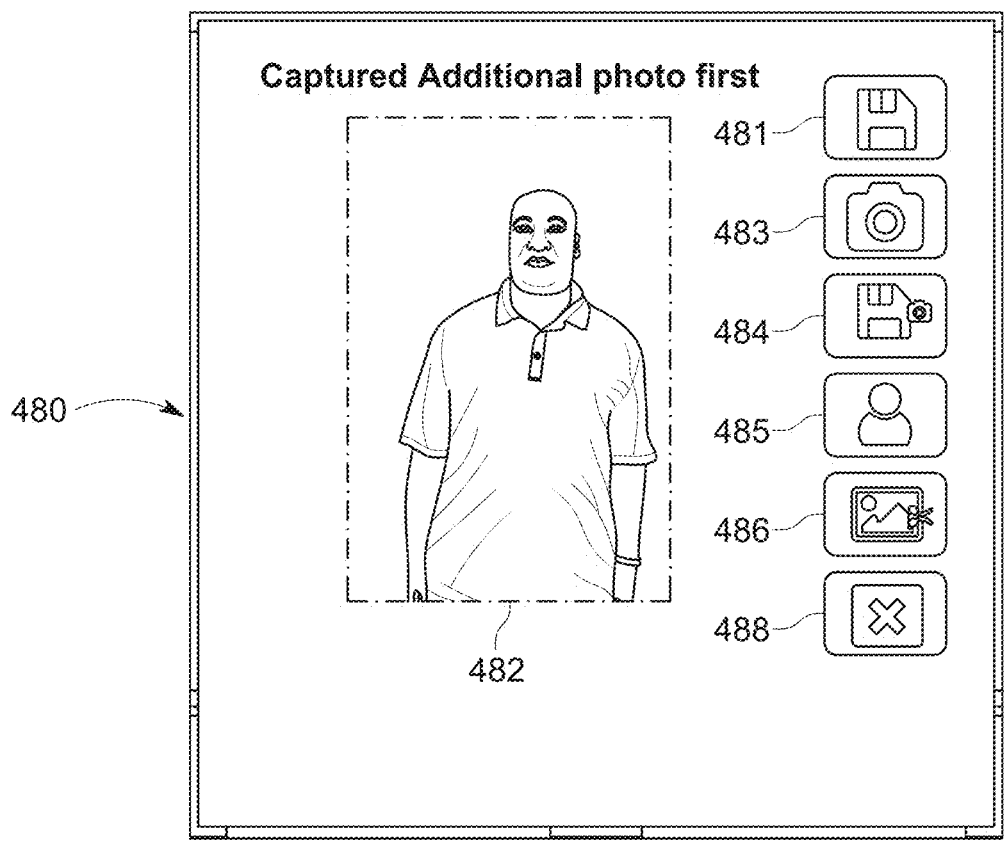
FIG. 14 is a user interface screenshot of a screen for capturing an additional image, in accordance with this disclosure.
Figure 15:
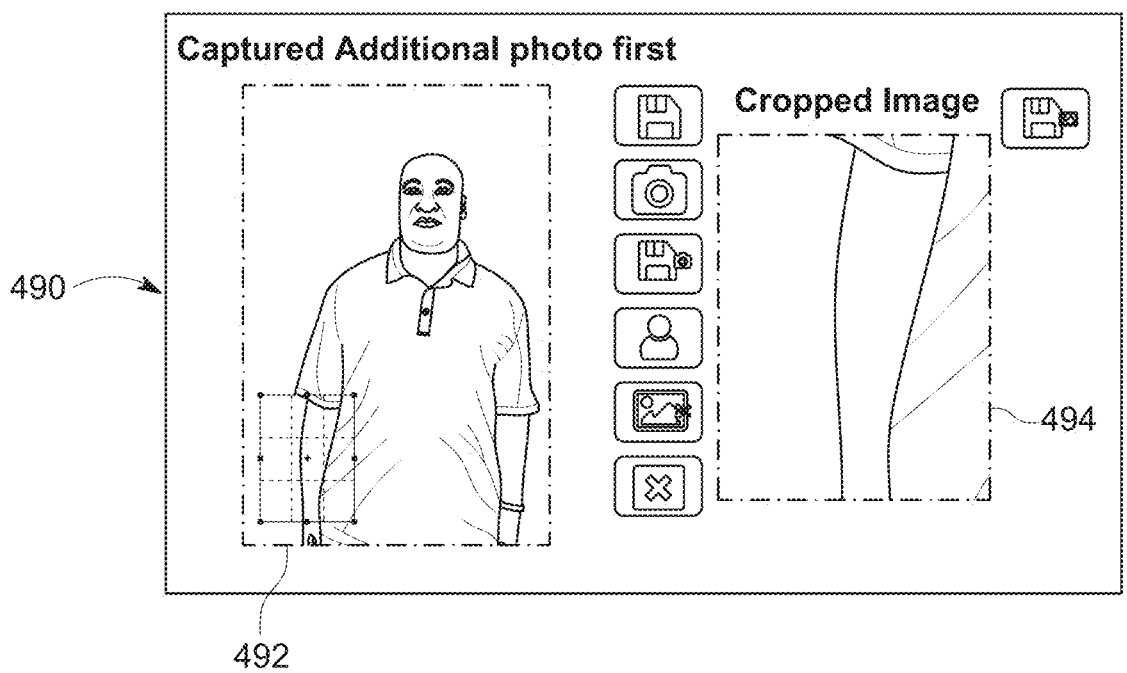
FIG. 15 is a user interface screenshot of a screen for capturing an additional image in which the additional image has been manually cropped, in accordance with this disclosure.

Step 308 of method 300 also includes step 260 of FIG. 2 in which an additional image is captured, cropped and saved. FIG. 14 is a user interface screenshot 480 of a screen for capturing an additional image, in accordance with this disclosure. In this instance, additional image 482 is captured first (before head shots and SMTs). Screenshot 480 provides various operator options including button 481 for saving image 482; button 483 for recapturing the image; button 484 for saving image 482 and capturing another image; button 485 for automatically cropping the face; button 486 for manually cropping; and button 488 for canceling the capture of an additional photo. FIG. 15 is a user interface screenshot 490 of a screen for capturing an additional image 492, in which manually cropping has been selected to result in cropped image 494.

Continuing with method 300, once all images have been captured in step 308 as described above, an option 310 is provided to capture a voice clip of the subject. The voice clip of the subject may be considered as another form of soft biometrics. In capturing the voice clip, the subject is given scripted keywords or phrases to speak (step 312) or the operator can manually start a recording. If a keyword is used, the system may automatically start recording the voice clip. Once complete, the voice clip is transcribed as text in step 314. If the transcription matches the scripted keywords or phrases (316-Y), the voice clip is saved in step 318, and if the transcription does not match the keywords or phrases (316-N), another voice clip may be captured in step 312.

System 10 and methods 200, 300 may include various additional features. Images may be output in multiple formats simultaneously, such as JPG, JP2K, PNG, etc. In addition, the same image may be exported at multiple resolutions for various use cases. For example, county agencies may require the highest resolution possible while local municipalities may not need such a high resolution. Where multiple images are captured from different angles, the photos may be combined to generate a 3D image of the subject. In some implementations, the multiple images that are combined to generate the 3D image are captured by one image capture device, and in other implementations, the multiple images combined to generate the 3D image are captured by multiple image capture devices. In some implementations, videos/images of the subject's gait may be captured and stored in order to provide another metric for human identification.

System 10 may ensure the origin of images such as, for example, by ensuring that the images are compliant with appropriate standards such as the Coalition for Content Provenance and Authenticity. In some examples, a watermark feature may be provided by which an additional image is generated and/or output by system 10 with an applicable watermark of the agency. In some examples, a stenography feature may embed details of the image as text in the image. In some examples, while live viewing, the name of the subject (if given) is displayed near the subject's face. In some examples, a screen description feature is provided that utilizes a vision language model to describe the photo (e.g., "45 year old white female wearing glasses with curly black hair"). In some examples, a pencil sketch feature may be included that generates a pencil sketch of the subject. Where captured images are not to be used to create or train deep learning models, a "poison pill" feature may be provided by which data is added to the image that does not affect image quality but prevents the image from being used to create or train deep learning models.

Additional features of system 10 may include deep learning based heart rate detection, such that a subject in stress is able to get aid. A remote view feature may be provided that allows a third party to view the environment of system 10 and offer assistance.

Figure 18:
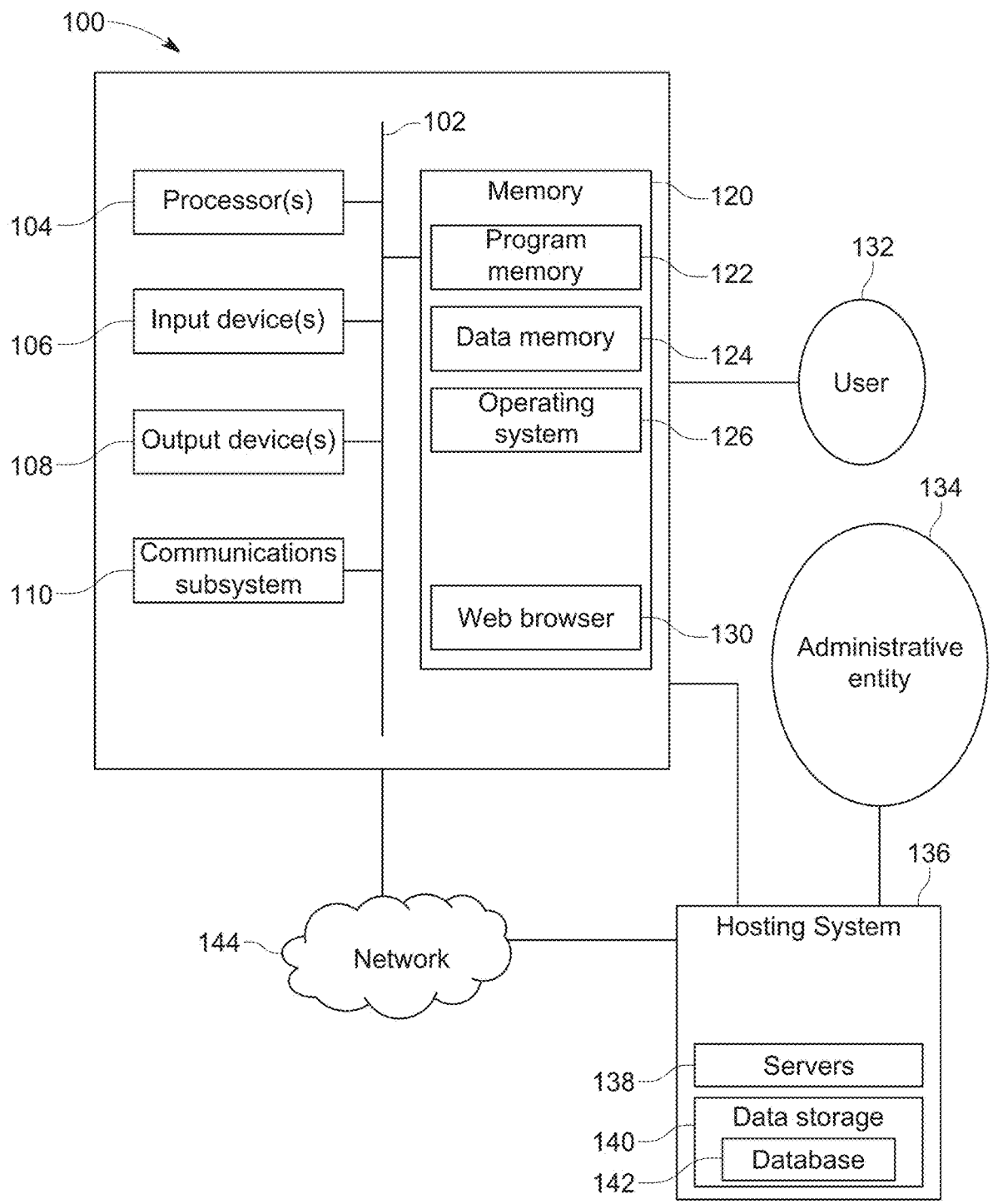
FIG. 18 is a conceptual block diagram illustrating a system of one or more computing devices for implementing the automated portrait, photo pose, and soft biometrics capture system of FIG. 1, in accordance with this disclosure.

FIG. 18 illustrates an exemplary, non-limiting system of one or more computing devices 100 and various components that may be employed in practicing embodiments of this disclosure. Some or all of automated portrait, photo pose, and soft biometrics capture system 10 and its components 12-26, and methods 200 and 300, for example, may be incorporated in one or more computing devices such as computing device 100. Computing device 100 may be any type of computing device known or created in the future. This may include, without limitation, fixed in place computers, such as desktop computers, or mobile computing devices. Mobile computing devices may include, but are not limited to, laptop computers, smartphones, and mobile phones, tablets, wearable devices, smart watches, or any other type of mobile electronic computing device.

FIG. 18 is a schematic illustration of one embodiment of a computing device 100 that can perform and implement the system and methods disclosed herein, and/or can function as the host computer system, a remote kiosk/terminal, a mobile device, and/or any other necessary computer system. FIG. 18 provides only a generalized illustration of components of computing device 100, any or all of which may be utilized as appropriate, and broadly illustrates how individual system elements may be implemented in a relatively separated manner or in a relatively more integrated manner.

Computing device 100 may be any type of information handling system, including, but not limited to, any type of computing device as noted above. To reiterate, this may include small handheld and/or wearable devices, such as handheld computer/mobile telephones, as well as large mainframe systems, such as a mainframe computer. Other non-limiting examples of computing devices include laptops, notebooks, workstation computers, personal computer systems, as well as servers (e.g., servers 138). Computing devices 100 can be used by various parties described herein and may be connected on a computer network, such as computer network 144. Types of computer networks that can be used to interconnect the various information handling systems may include, but are not limited to, Local Area Networks (LANs), Wireless Local Area Networks (WLANs), the Internet (e.g., World Wide Web), the Public Switched Telephone Network (PSTN), other wireless networks, and any other network topology that can be used to interconnect information handling systems.

Computing device 100 comprises hardware elements that can be electrically coupled via a bus 102 (or may otherwise be in communication, as appropriate). The hardware elements of computing device 100 may include one or more processors 104, including without limitation one or more general-purpose processors and/or one or more special-purpose processors (such as digital signal processing chips, graphics acceleration processors, and/or the like). Computing device 100 may further include one or more input devices 106, such as one or more cameras, sensors (including inertial sensors), a mouse, a keyboard, and/or the like.

Computing device 100 may also include one or more output devices 108 such as a display. In some embodiments, an input device 106 and an output device 108 of computing device 100 may be integrated, for example, in a touch screen or capacitive display as commonly found on mobile computing devices as well as desktop computers and laptops.

Processors 104 may have access to a memory such as memory 120. Memory 120 may include one or more of various hardware devices for volatile and non-volatile storage and may include both read-only and writable memory. For example, memory 120 may comprise random access memory (RAM), CPU registers, read-only memory (ROM), and writable non-volatile memory, such as flash memory, hard drives, floppy disks, CDs, DVDs, magnetic storage devices, tape drives, device buffers, and so forth. Memory 120 is not a propagating signal divorced from underlying hardware and is thus non-transitory. Memory 120 may include program memory such as program memory 122 capable of storing programs and software, such as programs and software implementing methods 200 and 300. Memory 120 may also include data memory such as data memory 124 that may include database query results, configuration data, settings, user options or preferences, etc., which may be provided to program memory 122 or any element of computing device 100.

Computing device 100 may further include (and/or be in communication with) one or more non-transitory storage devices, which can comprise, without limitation, local and/or network accessible storage, and/or can include, without limitation, a disk drive, a drive array, an optical storage device, a solid-state storage device such as a random access memory ("RAM") and/or a read-only memory ("ROM"), which can be programmable, flash-updateable and/or the like. Such storage devices may be configured to implement any appropriate data storage, including without limitation, various file systems, database structures, and/or the like. The storage devices may be non-volatile data storage devices in one or more non-limiting embodiments. Further, computing device 100 may be able to access removable nonvolatile storage devices that can be shared among information handling systems (e.g., computing devices) using various techniques, such as connecting the removable nonvolatile storage device to a USB port or other connector of the information handling systems.

Computing device 100 may also include a communications subsystem 110, which may include without limitation a modem, a network card (wireless or wired), an infrared communication device, a wireless communication device and/or chipset (such as a Bluetooth™ device, an 802.11 device, a WiFi device, a WiMax device, cellular communication facilities, etc.), and/or the like. Communications subsystem 110 may permit data to be exchanged with a network (e.g., such as network 144), other computer systems, and/or any other devices.

Computing device 100 also comprises software components, shown as being located within memory 120, which may include an operating system 126, device drivers, executable libraries, and/or other code, which may comprise computer programs provided by various embodiments, and/or may be designed to implement methods, and/or configure systems as described herein. In some embodiments, the operating system is an immutable operating system, meaning that the operating system is designed to be unchangeable and read-only. In essence, once deployed, the operating system cannot be altered. An immutable operating system provides enhanced security and is difficult for malicious actors to tamper with, as well as ease of configuration, upgrade, and maintenance. In some implementations, the operating system is based on a customized GNU/Linux distribution. The methods and procedures of this disclosure, including methods 200 and 300, may be implemented as code and/or instructions executable by a computer (and/or a processor within a computer). Such code and/or instructions can be used to configure and/or adapt computing device 100 to perform one or more operations in accordance with the described methods of this disclosure.

A set of these instructions and/or code may be stored on a computer-readable storage medium, such as the storage device(s) described above. In some cases, the storage medium may be incorporated within a computer system, such as computing device 100. In other embodiments, the storage medium may be separate from computing device 100 (e.g., a removable medium, such as a compact disc or USB stick), and/or be provided in an installation package, such that the storage medium can be used to program, configure, and/or adapt a general-purpose computer with the instructions/code stored thereon. These instructions may take the form of executable code, which is executable by computing device 100 and/or may take the form of source and/or installable code, which, upon compilation and/or installation on computing device 100 (e.g., using any of a variety of generally available compilers, installation programs, compression/decompression utilities, etc.) then takes the form of executable code.

Substantial variations may be made in accordance with specific requirements. For example, customized hardware may be used, and certain elements may be implemented in hardware, software (including portable software, such as applets, etc.), or both. Further, connection to other computing devices such as network input/output devices may be employed.

Some embodiments may employ a computer system (such as computing device 100) to perform methods in accordance with this disclosure. Some or all of the described methods may be performed by computing device 100 in response to one or more processors 104 executing one or more sequences of one or more instructions (which might be incorporated into operating system 126 and/or other code contained in memory 120). Such instructions may be read into memory 120 from another computer-readable medium, such as one or more of the storage devices. Execution of the sequences of instructions contained in memory 120 may cause one or more processors 104 to perform one or more methods described herein.

The terms "machine-readable medium" and "computer-readable medium," as used herein, refer to any medium that participates in providing data that causes a machine to operate in a specific fashion. In an embodiment implemented using computing device 100, various computer-readable media may be involved in providing instructions/code to processors 104 for execution and/or might be used to store and/or carry such instructions/code (e.g., as signals). In many implementations, a computer-readable medium is a physical and/or tangible storage medium. Such a medium may take many forms, including but not limited to, non-volatile media, volatile media, and transmission media. Non-volatile media may include, for example, optical and/or magnetic disks which may be an example of storage devices. Volatile media may include, without limitation, dynamic memory, which may be a type of memory included in memory 120. Transmission media may include, without limitation, coaxial cables, copper wire and fiber optics, including the wires that comprise bus 102, as well as the various components of communications subsystem 110 (and/or the media by which communications subsystem 110 provides communication with other devices). Transmission media can also take the form of waves (including without limitation radio, acoustic, and/or light waves, such as those generated during radio-wave and infrared data communications).

Common forms of physical and/or tangible computer-readable media include, for example, a floppy disk, a flexible disk, hard disk, magnetic tape, or any other magnetic medium, a CD-ROM, any other optical medium, any other physical medium with patterns of holes, a RAM, a PROM, EPROM, a FLASH-EPROM, any other memory chip or cartridge, a carrier wave as described hereinafter, or any other medium from which a computer can read instructions and/or code.

Various forms of computer-readable media may be involved in carrying one or more sequences of one or more instructions to processor(s) 104 for execution. The instructions may initially be carried on a magnetic disk and/or optical disc of a remote computer. A remote computer might load the instructions into its dynamic memory and send the instructions as signals over a transmission medium to be received and/or executed by computer system 100. These signals, which may be in the form of electromagnetic signals, acoustic signals, optical signals, and/or the like, are all examples of carrier waves on which instructions can be encoded, in accordance with various aspects of the embodiments.

Communications subsystem 110 (and/or components thereof) generally will receive the signals, and bus 102 may then carry the signals (and/or the data, instructions, etc. carried by the signals) to memory 120, from which processors 104 retrieve and execute the instructions. The instructions received by memory 120 may optionally be stored on a non-transitory storage device either before or after execution by processor(s) 104.

Computing device 100 may be in communication with one or more networks, such as network 144. Network 144 may include a local area network (LAN), such as a company Intranet, a metropolitan area network (MAN), or a wide area network (WAN), such as the Internet or World Wide Web. Network 144 may be a private network, a public network, or a combination thereof.

Network 144 may be any type of network known in the art, including a telecommunications network, a wireless network (including Wi-Fi), and a wireline network. Network 144 may include mobile telephone networks utilizing any protocol or protocols used to communicate among mobile digital computing devices (e.g., computing device 100), such as GSM, GPRS, UMTS, AMPS, TDMA, or CDMA. In one or more non-limiting embodiments, different types of data may be transmitted via network 144 via different protocols. In further non-limiting other embodiments, computing device 100 may act as a standalone device or may operate as a peer machine in a peer-to-peer (or distributed) network environment.

Network 144 may further include a system of terminals, gateways, and routers. Network 144 may employ one or more cellular access technologies including but not limited to: 2nd (2G), 3rd (3G), 4th (4G), 5th (5G), LTE, Global System for Mobile communication (GSM), General Packet Radio Services (GPRS), Enhanced Data GSM Environment (EDGE), and other access technologies that may provide for broader coverage between computing devices if, for instance, they are in a remote location not accessible by other networks.

In one or more non-limiting embodiments, a computing device, such as computing device 100 may include a web browser such as web browser 130. Web browser 130 may be any type of web browser known in the art that may be used to access one or more web applications on user computing devices 100 or the like. Web applications are applications that are accessible by network 144 and may be located on the Internet or World Wide Web. Web browser 130 may include a variety of hardware, software, and/or firmware generally operative to present a web application to a user via display device 108 (e.g., touchscreen or other type of monitor or display device) on a computing device. Examples of suitable web browsers include, but are not limited to, MICROSOFT EDGE, GOOGLE CHROME, MOZILLA FIREFOX, and APPLE SAFARI. Web browser 130 may be previously installed by the manufacturer or company associated with computing device 100, or alternatively, may be downloaded onto computing device 100. Web browser 130 may be stored in a separate storage device and/or memory 120.

In one or more non-limiting embodiments, one or more aspects of the embodiments described herein may be implemented as a web service. As known in the art, a web service may be a software module or software program that is designed to implement a set of tasks that is accessible from multiple computing devices, such as computing device 100 over a network, such as network 144. One or more features may be implemented as a web service accessible using the World Wide Web as the connecting network 144, although any alternative type of network may be used. When implemented as a web service, embodiments can be searched for over network 144 using input devices 106 and can be invoked accordingly. Further, when invoked as a web service, various aspects of the embodiments would be able to provide functionality to the user who invoked that web service.

When implemented as a web service, a user may invoke a series of web service calls via requests to one or more servers 138 that are part of hosting system 136 that hosts the actual web service. In one or more non-limiting embodiments, hosting system 136 may be a cloud-based hosting system. "Cloud-based" is a term that refers to applications, services, or resources made available to users on demand via a network, such as network 144, from a cloud computing provider's server. In one non-limiting embodiment, administrative entity 134 may be the cloud computing provider and may use servers 138 to provide access to aspects of the described embodiments.

Hosting system 136 may include data storage systems 140 that can provide access to stored data by applications running on computing devices that may be geographically separate from each other, provide offsite data backup and restore functionality, provide data storage to a computing device with limited storage capabilities, and/or provide storage functionality not implemented on a computing device such as device 100.

Hosting system 136 may be a service that can be implemented as a web service, in one or more non-limiting embodiments, with a corresponding set of Web Service Application Programming Interfaces (APIs). The Web Service APIs may be implemented, for example, as a Representational State Transfer (REST)-based Hypertext Transfer Protocol (HTTP) interface or a Simple Object Access Protocol (SOAP)-based interface. Any programming languages may be used to implement aspects of the described embodiments as a web service, including, but not limited to .Net, Java, Rust, C++, and Go. Further, a web service may use standardized industry protocol for the communication and may include well-defined protocols, such as Service Transport, XML Messaging, Service Description, and Service Discovery layers in the web services protocol stack.

For instance, the hosting system can be implemented such that client applications (for example, executing on computing device 100) can store, retrieve, or otherwise manipulate data objects in hosting system 136. Hosting system 136 can be implemented by one or more server devices 138, which can be implemented using any type of computing device.

In one or more non-limiting embodiments, administrative entity 134 is the provider and creator of certain aspects of the described embodiments. Administrative entity 134 may provide an application programming interface for use by users 132. Administrative entity 134 may be able to manipulate and alter the interface to affect its operation and maintenance on server(s) 138 and as stored on one or more data storage devices 140 that are part of hosting system 136. Data storage devices 140 included for storing data associated with the described embodiments may include one or more databases 142 that store live and historical data. Data storage devices 140, via databases 142 in some cases, may be able to store all data obtained from users 132. While administrative entity 134 is depicted as a single element communicating over network 144 and through hosting system 136, administrative entity 134 may alternatively be distributed over network 144 in multiple physical locations.

Various aspects of this disclosure may be implemented as a downloadable software module that can be stored directly on a computing device, such as computing device 100, rather than acting as a web service accessible through a computing device's web browser 130. Accordingly, user 132 may be able to download and store aspects of the described embodiments on computing device 100 as a computer-based application and software module that runs using the working engines and modules on the computing device. Some aspects of the embodiments may be preinstalled on computing device 100 or any other computing device. Aspects of the embodiments may be innate, built into, or otherwise integrated into existing platforms such as, without limitation thereto, a website, third-party program, iOS™, Android™ or any other platform capable of transmitting, receiving, and presenting data.

The methods, systems, and devices disclosed herein are examples. Various embodiments may omit, substitute, or add various procedures or components as appropriate. In alternative configurations, the methods described may be performed in an order different from that described, and/or various stages may be added, omitted, and/or combined. Features described with respect to certain embodiments may be combined in various other embodiments. Different aspects and elements of the embodiments may be combined in a similar manner. Technology evolves and, thus, many of the elements are examples that do not limit the scope of the disclosure to those specific examples.

Specific details are given in the description to provide a thorough understanding of the disclosed embodiments. However, embodiments may be practiced without these specific details. For example, well-known circuits, processes, algorithms, structures, and techniques have been shown without unnecessary detail to avoid obscuring the embodiments. This description provides example embodiments only, and is not intended to limit the scope, applicability, or configuration of this disclosure. Rather, the preceding description will enable those skilled in the art to implement embodiments of this disclosure. Various changes may be made in the function and arrangement of elements without departing from the spirit and scope of this disclosure. Accordingly, additional components known to one of ordinary skill in the art, even if not illustrated in FIG. 18, may also be included in computing device 100.

Some embodiments are described as processes depicted as flow diagrams or block diagrams. Although each may describe the operations as a sequential process, many of the operations can be performed in parallel or concurrently. The order of the operations may be rearranged. A process may have additional steps not included in the figure. Furthermore, embodiments of the methods may be implemented by hardware, software, firmware, middleware, microcode, hardware description languages, or any combination thereof. When implemented in software, firmware, middleware, or microcode, the program code or code segments to perform the associated tasks may be stored in a computer-readable medium such as a storage medium. Processors may perform the associated tasks.

Various modifications, alternative constructions, and equivalents may be used without departing from the spirit of the disclosure. The above elements may be components of a larger system, wherein other rules may take precedence over or otherwise modify the application of the invention. Also, a number of steps may be undertaken before, during, or after the above elements are considered. Accordingly, the above description does not limit the scope of the disclosure.

The corresponding structures, materials, acts, and equivalents of all means or step plus function elements in the claims below are intended to include any structure, material, or act for performing the function in combination with other claimed elements as specifically claimed. This disclosure has been presented for purposes of illustration and description but is not intended to be exhaustive or limited to the form disclosed. Many modifications and variations will be apparent to those of ordinary skill in the art without departing from the scope and spirit of this disclosure.

The embodiments were chosen and described to best explain the principles of this disclosure and its practical applications, and to enable others of ordinary skill in the art to understand the disclosure for various embodiments with various modifications as are suited to the particular use contemplated. The embodiments disclosed herein may be practiced with modification and alteration within the spirit and scope of the appended claims. Thus, the description is illustrative and not restrictive.

The invention claimed is:

1. A system for capturing, identifying, and processing images and soft biometrics comprising:
   an image capture device configured to capture an image of a subject;
   a pan and tilt device configured to adjust a position of the image capture device;
   a speaker configured to provide audio feedback or instructions to the subject while the image is being captured;
   a microphone configured to capture a voice clip of the subject; and
   a computing device configured to control the image capture device, the pan and tilt device, the speaker, and the microphone, wherein the computing device is configured to:
      detect whether the captured image is focused and, if the captured image is not focused, prompt an operator to recapture the image;
      detect using facial recognition whether the subject in the captured image matches a known image of the subject;
      detect a number of subjects in the captured image and, if the number of subjects does not match an expected number of subjects, prompt the operator to recapture the image;

detect whether any unwanted objects or obstructions are in the captured image and, if any unwanted objects or obstructions are detected, prompt the operator to recapture the image;

automatically crop the captured image and, if the captured image cannot be cropped, prompt the operator to recapture the image; and detect, crop, and classify any scar, mark, or tattoo (SMT) that is present in the captured image.

2. The system of claim 1, wherein the computing device is configured to automatically detect whether the subject is in a correct pose and to operate the image capture device to capture the image when the subject is in the correct pose.

3. The system of claim 1, wherein after cropping the captured image, the computing device is further configured to perform a check of the captured and cropped image comprising:

detecting whether eyes and mouth of the subject are open or closed in the captured image;

detecting any redeye in the captured image;

detecting whether a background color of the captured image satisfies an applicable standard;

detecting and evaluating lighting conditions of the captured image;

detecting a location of the subject in the captured image;

detecting whether the subject is in a correct pose; and detecting whether an expression of the subject is compliant with the applicable standard; and wherein, based on the results of the check, the computing device is configured to either save the captured image or recapture another image of the subject.

4. The system of claim 1, wherein the computing device is further configured to detect whether the proper number of subjects are in the captured image using a deep learning based subject detection model.

5. The system of claim 1, wherein the computing device is further configured to detect makeup or face-paint to ensure that a face of the subject is not concealed.

6. The system of claim 1, wherein the computing device is further configured to detect whether any unwanted objects or obstructions are in the captured image using a deep learning based object detection model.

7. The system of claim 6, wherein the deep learning based object detection model is configured to detect and classify eyewear and articles of clothing.

8. The system of claim 2, wherein the computing device is further configured to confirm that the subject is in the correct pose by using a deep learning model to detect facial and body landmarks or by using a deep learning image classification model.

9. The system of claim 2, wherein the computing device is further configured to detect yaw, pitch, and roll of a head of the subject to determine whether the head is properly tilted.

10. The system of claim 2, wherein the computing device is further configured to detect whether the expression of the subject is compliant with the applicable standard by using a deep learning model trained with multiple images of multiple emotion expressions.

11. The system of claim 1, wherein the computing device is further configured to detect, crop, and classify the SMT using a deep learning detection model, and to improve the deep learning detection model using active learning.

12. The system of claim 11, wherein the computing device is further configured to recognize any text contained in the SMT by optical character recognition (OCR), translate the text if necessary, and store the text.

13. The system of claim 12, wherein the computing device is further configured to detect a size, a color, and an on body location of the SMT.

14. The system of claim 1, wherein when a head of the subject is tilted in the captured image beyond what the specification allows, the computing device calculates a tilt angle of the head, rotates the captured image by the tilt angle, and crops the captured image.

15. The system of claim 1, wherein the computing device is further configured to control the speaker to announce instructions in a selected language of the subject and in a gender that is automatically determined based on an age, race, and gender of the subject.

16. The system of claim 1, wherein the computing device is further configured to control the microphone to capture a voice clip from the subject, transcribe the voice clip, and determine whether the voice clip matches a scripted phrase.

17. The system of claim 1, wherein the computing device is further configured to combine multiple images captured by the image capture device to generate a 3D image of the subject.

18. The system of claim 1, wherein the computing device is further configured to generate an additional image comprising the captured image embedded with a watermark.

19. The system of claim 1, wherein the computing device is further configured to generate an additional image comprising a pencil sketch of the subject.

20. The system of claim 1, wherein the computing device is further configured to detect a heart rate of the subject using a deep learning model to facilitate aid if the subject is in stress.

* * * * *